US010637093B2

(12) United States Patent
Snyder et al.

(10) Patent No.: US 10,637,093 B2
(45) Date of Patent: Apr. 28, 2020

(54) THIN FILM BATTERY STRUCTURES HAVING SLOPED CELL SIDEWALLS

(71) Applicant: Apple Inc., Cupertino, CA (US)

(72) Inventors: Shawn William Snyder, Santa Clara, CA (US); Tetsuya Ishikawa, San Jose, CA (US)

(73) Assignee: Apple Inc., Cupertino, CA (US)

(*) Notice: Subject to any disclaimer, the term of this patent is extended or adjusted under 35 U.S.C. 154(b) by 128 days.

(21) Appl. No.: 16/007,369

(22) Filed: Jun. 13, 2018

(65) Prior Publication Data

US 2018/0294507 A1 Oct. 11, 2018

Related U.S. Application Data

(62) Division of application No. 14/722,050, filed on May 26, 2015, now Pat. No. 10,020,532.

(Continued)

(51) Int. Cl.
*H01M 10/04* (2006.01)
*H01M 10/02* (2006.01)
(Continued)

(52) U.S. Cl.
CPC ......... *H01M 10/0436* (2013.01); *H01M 2/26* (2013.01); *H01M 4/64* (2013.01);
(Continued)

(58) Field of Classification Search
CPC ............ H01M 2/26; H01M 4/13; H01M 6/40; H01M 10/02; H01M 10/0436;
(Continued)

(56) References Cited

U.S. PATENT DOCUMENTS 6,224,995 B1 * 5/2001 Fauteux .............. H01M 4/0442
29/623.1
7,682,733 B2 3/2010 Eisenbeiser
(Continued)

FOREIGN PATENT DOCUMENTS

| JP | 2002042863 A | 2/2002 |
| JP | 2004303535 A | 10/2004 |
| WO | 2011093126 A1 | 8/2011 |

OTHER PUBLICATIONS

PCT International Search Report and Written Opinion for PCT International Appln. No. PCT/US2015/032483 dated Nov. 3, 2015 (21 pp).

(Continued)

*Primary Examiner* — Gregg Cantelmo
(74) *Attorney, Agent, or Firm* — Young Basile Hanlon & MacFarlane, P.C.

(57) ABSTRACT

Solid-state battery structures and methods of manufacturing solid-state batteries, such as thin-film batteries, are disclosed. More particularly, embodiments relate to solid-state batteries having a current collector tab between multiple electrochemical cells each having an electrolyte layer between an anode layer and a cathode layer in a vertical direction. The anode layer, the electrolyte layer, and the cathode layer include respective sidewalls exposed along a cell sidewall, and the cell sidewall has a non-zero, non-vertical slope.

18 Claims, 14 Drawing Sheets

Related U.S. Application Data

(60) Provisional application No. 62/165,101, filed on May 21, 2015, provisional application No. 62/003,504, filed on May 27, 2014.

(51) Int. Cl.
| | | |
|---|---|---|
| *H01M 2/26* | (2006.01) | |
| *H01M 4/13* | (2010.01) | |
| *H01M 10/052* | (2010.01) | |
| *H01M 10/0525* | (2010.01) | |
| *H01M 10/0562* | (2010.01) | |
| *H01M 10/0585* | (2010.01) | |
| *H01M 6/40* | (2006.01) | |
| *H01M 4/64* | (2006.01) | |
| *H01M 4/70* | (2006.01) | |

(52) U.S. Cl.
CPC ............ *H01M 4/70* (2013.01); *H01M 10/02* (2013.01); *H01M 10/0463* (2013.01); H01M 4/13 (2013.01); H01M 6/40 (2013.01); H01M 10/052 (2013.01); H01M 10/0525 (2013.01); H01M 10/0562 (2013.01); H01M 10/0585 (2013.01)

(58) Field of Classification Search
CPC ........... H01M 10/0463; H01M 10/052; H01M 10/0525; H01M 10/0562; H01M 10/0585; H01M 4/64; H01M 4/70; H01M 4/78
See application file for complete search history.

(56) References Cited

U.S. PATENT DOCUMENTS

| | | |
|---|---|---|
| 8,384,341 B2 | 2/2013 | Shacklette et al. |
| 9,461,347 B2 | 10/2016 | Kise et al. |
| 2004/0147961 A1 | 7/2004 | O'phelan et al. |
| 2005/0079418 A1 | 4/2005 | Kelley et al. |
| 2008/0032236 A1* | 2/2008 | Wallace ............... H01M 6/40 |
| | | 430/319 |
| 2009/0148759 A1 | 6/2009 | Mitsuda et al. |
| 2011/0177392 A1 | 7/2011 | Hoshiba |
| 2011/0272786 A1 | 11/2011 | Besling et al. |
| 2012/0225345 A1 | 9/2012 | Kim |
| 2013/0131745 A1 | 5/2013 | Viavattine |

OTHER PUBLICATIONS

PCT Chapter I International Preliminary Report on Patentability (IPRP Chapter I) PCT/US2015/032483 dated Dec. 8, 2016 (16 pp).
PCT Invitation to Pay Additional Fees and, Where Applicable, Protest Fee, PCT/US2015/032483, dated Aug. 11, 2015 (9 pp).

\* cited by examiner

THIN FILM BATTERY STRUCTURES HAVING SLOPED CELL SIDEWALLS

CROSS REFERENCE TO RELATED APPLICATIONS

This application is a divisional application of U.S. Pat. No. 10,020,532 filed on May 26, 2015, which claims the benefit of U.S. Provisional Patent Application No. 62/003,504, filed May 27, 2014, and U.S. Provisional Patent Application No. 62/165,101, filed May 21, 2015, each hereby incorporated herein by reference.

TECHNICAL FIELD

Embodiments relate to electrochemical devices and methods of manufacturing electrochemical devices. More particularly, some embodiments relate to solid-state batteries, and in particular thin film batteries. Other embodiments are also described.

BACKGROUND

Solid-state batteries, such as thin-film batteries, are known to provide better form factors, cycle life, power capability, and safety, as compared to conventional battery technologies. However, solid-state battery structure and manufacturing methods may be improved to further optimize battery performance and packaging.

Referring to FIG. 1, an electrochemical device, such as a solid-state battery, may include one or more electrochemical cells 100 having a substrate layer 102, a cathode layer 104, and an electrolyte layer 106. There may also be a barrier layer as shown, between the cathode layer 104 and the substrate layer 102. During fabrication of the electrochemical cell 100, there may be a need to cut or remove material from one or more of the cell layers using a laser.

SUMMARY

It has been discovered that the high energy of typical lasers used during fabrication of electrochemical cells, e.g., operations to cut or remove cell materials, may generate heat that causes melting, reflowing, and redeposition of the sheet materials. More particularly, as depicted in FIG. 2, melted materials may be ejected or reflowed and redeposited onto an upper surface of the electrochemical cell 200 as ejected slag 202 or along the cut face as a slag layer 204. FIGS. 3A and 3B provide magnified views of a cell surface after laser technology has been used to melt and cut away material. The figures illustrate a distinct ejected slag 202 that has redeposited onto the upper surface and a slag layer 204 along the cut face.

An issue caused by the ejected slag 202 that is formed over the electrolyte layer 106 is the risk that the slag layer 202 will become an electrical short between the cathode layer and the anode layer of a cell. This can be explained using FIG. 4, which is a partial side view of an electrochemical device 400. The electrochemical device 400 may include the electrochemical cell 200 having ejected slag 202 over the electrolyte layer 106. Furthermore, an anode layer 402 has been deposited over the electrolyte layer 106. It can be seen that anode layer 402 may come close to making contact with the conductive slag layer 204 and ejected slag 202. To avoid this, the anode layer 402 is masked away from an outer edge of the cell during deposition, so as to maintain a margin 404 between the ejected slag 202 and the anode layer 402.

A problem with adding the margin 404, however, is that it may cause underutilization of the electrochemical cell area, since it in effect creates a cathode area with no opposing anode area over the margin 404. This can make the cathode layer 104 appear to have a virtual leak as the electrochemical device 400 goes through chemical equilibrium at rest. Thus, electrochemical device 400 having the margin 404 may have sub-optimal energy density.

Still referring to FIG. 4, the slag 202, 204 creates a further risk of electrical shorting when an anode current collector 406 is placed over the anode layer 402. To avoid electrical shorting between the cathode layer 104 and anode current collector 406, through the slag layer 204 and ejected slag 202, a z-gap 408 is maintained in a vertical direction, i.e., in the direction of layer stacking. But the z-gap 408 may cause underutilization of space in the vertical direction, particularly in a case in which multiple electrochemical cells 200 are stacked to form the electrochemical device 400. Thus, electrochemical device 400 having the z-gap 408 may have sub-optimal energy density.

In an embodiment, an electrochemical device may include a stack of two or more electrochemical cells, and at least one of the cells may include an insertion void, notch, slot, or other gap feature at an edge or side of the cell stack (cell sidewall), to receive a tab component, e.g., an anode current collector tab or a cathode current collector tab that makes electrical contact with the corresponding anode or cathode electrode. This may advantageously improve utilization of the available z-height for the battery stack, because the tab component now does not add to the z-height.

In an embodiment, an insertion void at an edge region of an electrochemical device permits insertion of an anode current collector tab that once inserted becomes electrically connected to respective anode layers of a pair of adjacent electrochemical cells. The electrochemical device includes a first electrochemical cell having a first electrolyte layer between a first anode layer and a first cathode layer in a stack direction. The first electrochemical cell may include an anode contact region and an anode current collector contact region, and the anode contact region may be offset in the stack direction from the anode current collector contact region. Furthermore, the electrochemical device may include a second electrochemical cell having a second electrolyte layer between a second anode layer and a second cathode layer. The second anode layer of the second electrochemical cell may face the first anode layer of the first electrochemical cell. For example, the first anode layer may touch or contact the second anode layer at the anode contact region. In an embodiment, the electrochemical device includes an anode current collector tab between the anode current collector contact region and the second electrochemical cell. The anode current collector tab may be disposed in a tab insertion space. The insertion void may be between the anode layers of the adjacent cells and have a distance in the stack direction between one anode and the anode current collector contact region of another anode. The distance may be at least as far as the offset between the anode contact region and the anode current collector contact region, and the anode current collector tab may fill the insertion void across the distance. The anode current collector tab may be physically located between the electrochemical cells, and furthermore, the respective anode layers of the electrochemical cells may be electrically connected to each other by the anode current collector tab. The anode current collector tab may physically contact the first anode layer, e.g., at the anode current collector contact region, and/or the second anode layer.

In an embodiment, an insertion void at an edge region of an electrochemical device, where two adjacent cells are connected, permits insertion of a cathode current collector tab that is electrically connected to the respective cathode layers of the two connected electrochemical cells. In an embodiment, the first electrochemical cell includes a first cathode layer between a first cathode current collector and the anode contact region of the first anode layer. The second electrochemical cell may include a second cathode layer between a second cathode current collector and the first anode layer. Furthermore, the first cathode current collector and the second cathode current collector may include respective exposed cathode current collector surfaces facing one another and not covered by the cathode layers or the anode layers. The exposed cathode current collector surfaces may be transversely offset from the anode contact region and the anode current collector contact region. In an embodiment, the cathode current collector tab is inserted between the exposed cathode current collector surfaces.

Rather than describing the gap feature that receives a tab in terms of an "insertion void," etc., the device structure may also be described in terms of separation distances between corresponding cell regions, where the separation distance may be greater near an edge region of the device as compared to a middle region of the device, thereby allowing for a current collector tab to be inserted between the cells over the edge region without increasing the z-height of the device over the middle region. In an embodiment, an electrochemical device includes a first electrochemical cell and a second electrochemical cell, and each cell has a respective electrolyte layer between a respective anode layer and a respective cathode layer in a stack direction. The cells may be separated by a separation distance in the stack direction that varies along a transverse direction, and the separation distance may be greater near an outer perimeter of the cells than near a medial portion of the cells. For example, the separation distance over the outer region may be similar to a thickness of a current collector tab and the separation distance over the inner region may be essentially zero. In an embodiment, a transition region tapers, e.g., along a ramp, between the outer region and the inner region. The outer region may include an anode collector contact region and the inner region may include an anode contact region, and furthermore, the anode collector contact region may be electrically connected to the anode contact region. In an embodiment, one or more of the anode contact region or the anode collector contact region includes at least a portion of a respective anode layer.

In accordance with an embodiment of the invention, an electrochemical device having one or more cells includes a cell stack up that includes an electrolyte layer between an anode layer and a cathode layer. The stack up of the anode layer, the electrolyte layer, and the cathode layer defines a cell sidewall that has a non-zero, non-vertical slope (or simply, slope). In one embodiment, the cell sidewall is said to be sloped in an outward direction, in that a height of the cell sidewall diminishes versus increasing distance in an outward direction. The anode layer, the electrolyte layer, and the cathode layer may include respective sidewalls exposed along the cell sidewall. For example, the cell sidewall may extend from a top surface of the anode layer to the exposed cathode current collector surface, and the exposed sidewalls of the layers may be contiguous along the non-zero, non-vertical slope. Thus, the cell sidewall in that region may have a fixed or alternatively a smoothly changing slope. Examples include a cell sidewall whose slope does not become zero, or exhibits no discontinuity. In an embodiment, the non-vertical slope may include a linear portion. The non-vertical slope may also include a curvilinear or nonlinear slope portion, instead of, or in addition to, the linear slope portion. The electrochemical cell may include additional layers in the cell stack, e.g., a cathode current collector, and the additional layers may include respective exposed sidewalls. For example, a cathode current collector may include an exposed sidewall that is contiguous with the other exposed sidewalls of the stack layers along the non-zero, non-vertical slope of the cell sidewall. The cell sidewall may extend from the top surface of the anode layer to a terminal edge on any other layer, e.g., the terminal edge may be on the cathode current collector at a location vertically offset from a top surface of the cathode current collector, and the exposed sidewall of the cathode current collector may extend between the top surface and the terminal edge.

In an embodiment, the cell sidewall having a non-zero, non-vertical slope may be contiguous in that the edges of the adjacent constituent layers of the cell are coincident. For example, the electrolyte sidewall may extend between an electrolyte top edge and the cathode layer, where the electrolyte top edge may be coincident with a bottom edge of the anode. Another way to describe a cell sidewall as having a non-zero, non-vertical slope is one whose anode bottom edge is laterally offset from the anode top edge, for example in an outward direction.

The sloped sidewall may be obtained by using a controlled, ablation process that limits the creation of heat during cutting across the various layers of the cell, to thereby avoid formation of the slag layers mentioned above. For example, the ablation process may be performed using an ablation laser to result in the cut cell having a sloped sidewall, and one that advantageously may be devoid of a slag layer, thereby avoiding the need for adopting the limited solutions described above (that cause under utilization of the electrochemical cell area).

As mentioned above, a controlled laser ablation process that limits the creation of heat during cutting may be used to fabricate the various cell and device architectures described below. In an embodiment, a method includes setting an intensity of a laser beam to a level less than required to melt one or more layers of an electrochemical cell. For example, setting the intensity may include setting a power of the laser beam and defocusing the laser beam to achieve the intensity. The method may also include lasing the one or more layers of the electrochemical cell with the laser beam to remove material from the cell layers and expose layer sidewalls along the cell sidewall having a non-zero, non-vertical slope.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
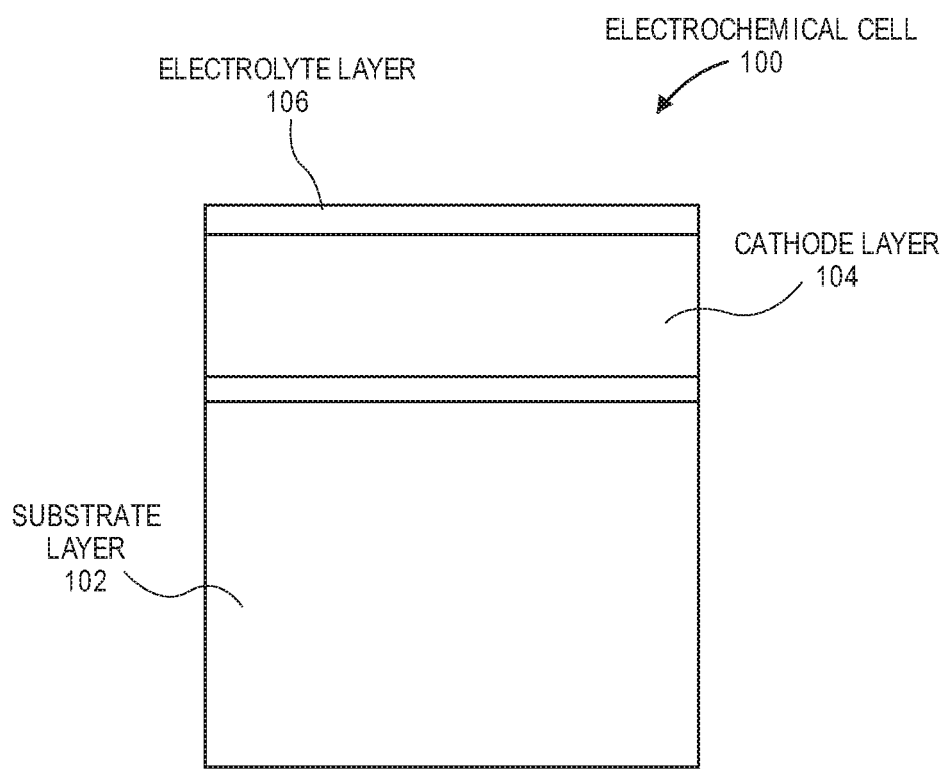
FIG. 1 is a side view of a sheet of multi-layered material used to manufacture an electrochemical cell.
Figure 2:
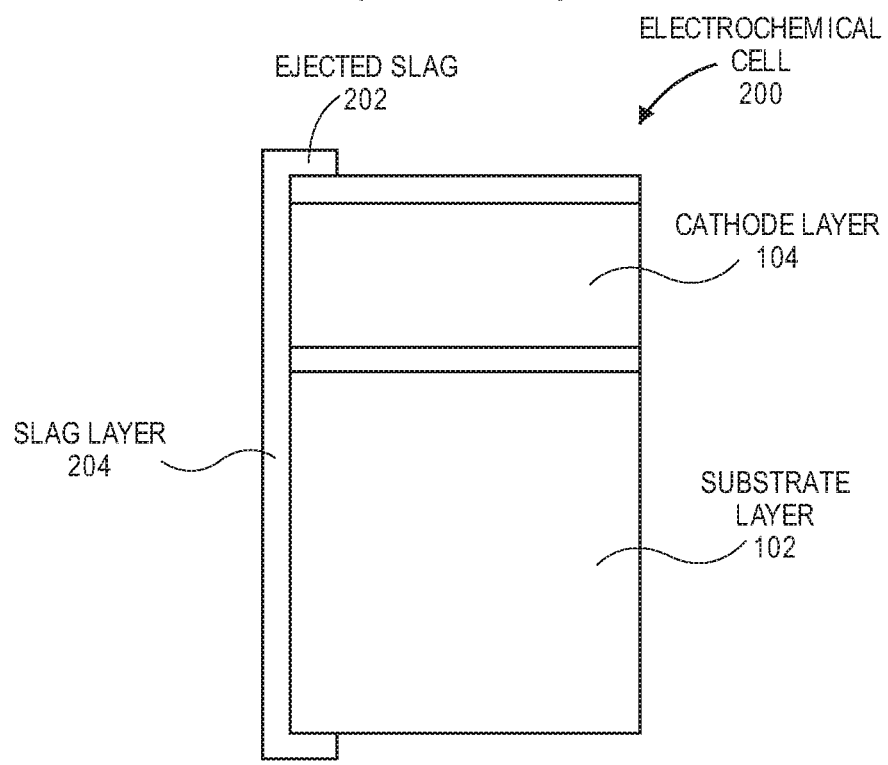
FIG. 2 is a side view of an electrochemical cell.
Figure 3A:
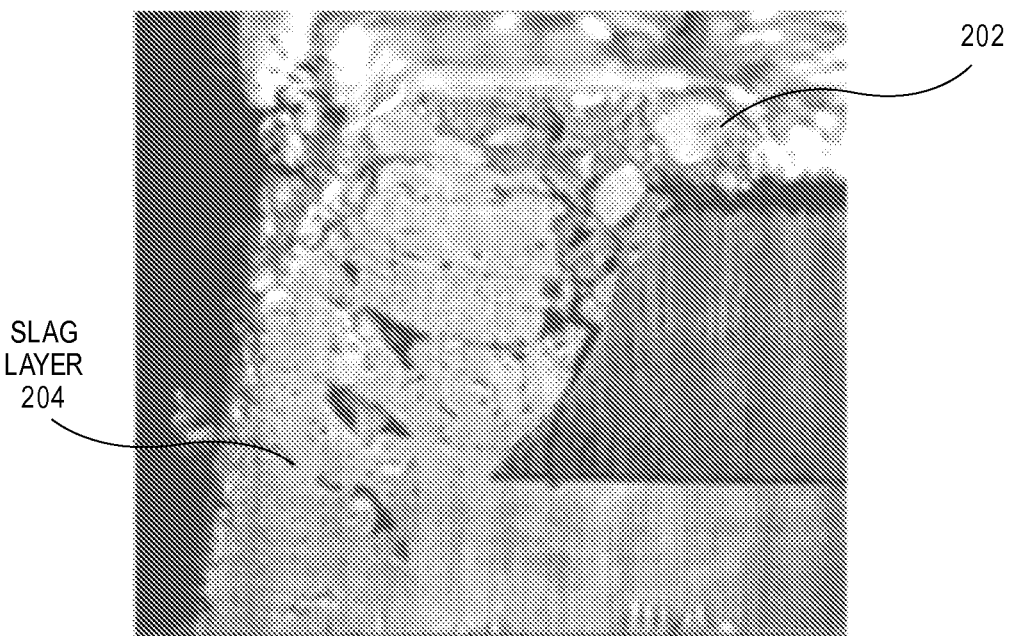
FIGS. 3A-3B are magnified views of an electrochemical cell, illustrating the redeposition of slag from the cut material.
Figure 3B:
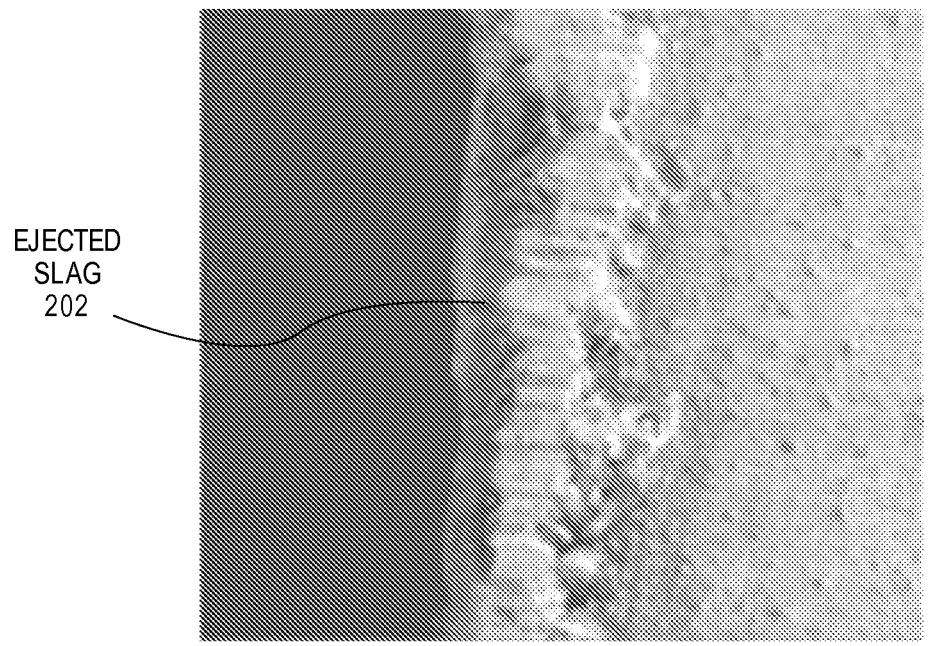

Structures and manufacturing methods for solid-state batteries are described. However, while some embodiments are described with specific regard to manufacturing processes or structures for integration within a solid-state battery, the embodiments are not so limited, and certain embodiments may also be applicable to other uses. For example, one or more of the embodiments described below may be used to manufacture other layered elements, such as silicon-based solar cells.

The following description is with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

In one aspect of the invention, an electrochemical cell includes several layers having respective sidewalls that combine to form a cell sidewall. Furthermore, the cell sidewall may include a non-vertical slope. For example, the cell sidewall may taper along the respective layer sidewalls, e.g., between an anode layer, an electrolyte layer, and a cathode layer, such that a height of the cell sidewall diminishes in a transverse direction outwardly from a top surface of the anode layer. The transverse direction may be distinguished from a stack direction (or a vertical direction), in that the transverse direction may be essentially orthogonal to the stack direction. Thus, the transverse direction may be considered to radiate perpendicular to stack axis 1014. An outward direction may be a direction away from a centerline or middle region of an electrochemical cell or electrochemical device. Thus, an outward transverse direction is orthogonal to stack axis 1014 located along a centerline of the cell or device. Accordingly, the respective sidewalls of the electrochemical cell layers may be contiguous, i.e., the edges of each layer of the electrochemical cell are coincident with edges of a next adjacent layer, thereby forming a contiguous cell sidewall. The non-vertical slope of the cell sidewall may have planar and/or curvilinear portions. Thus, the sloping cell sidewall may provide for a cathode layer that is essentially entirely covered by the anode layer, and thus, electroactive portions of the cell may be maximized and energy density of the electrochemical cell may be improved.

In another aspect, an electrochemical device having two electrochemical cells is provided. In an embodiment, the electrochemical cells are fabricated to include one or more recesses to receive a current collector. In an embodiment, both cells include one or more recesses, and in another embodiment, only one of the two cells includes one or more recesses. As a result of the recesses, a separation distance between the cells in a vertical direction varies over a transverse direction. For example, the separation distance between the cells over the recess area near an outer portion of the electrochemical cells may be greater than the separation distance between the cells near a medial portion of the cells. In an embodiment, a transition region such as a tapered region may be formed between the recessed region and the non-recessed regions. Furthermore, the recesses may include a portion of an anode layer or an exposed cathode current collector, i.e., a cathode current collector uncovered by other layers of the cell prior to insertion of a current collector tab, and the recessed regions may be placed in electrical connection with respective anode or cathode material near the medial region of the cell stack. More particularly, at least one of the electrochemical cells may include an anode collector contact region that is vertically offset in a vertical direction from an anode contact region of the electrochemical cell. Thus, when the electrochemical cells are apposed to one another, the recesses form a gap to facilitate insertion of an anode current collector tab to make electrical contact with the anode layers or to facilitate insertion of a cathode current collector tab to make electrical contact with the substrate layers. The gap may be filled entirely by the tabs, and in an embodiment, the tabs may be encompassed within the outer boundary of the electrochemical cells, to provide for a square or rectangular electrochemical device profile when viewed from above. This efficient packaging of the tabs within the electrochemical device provides for optimized energy density and a more compact form factor for improved product packaging.

Figure 5:
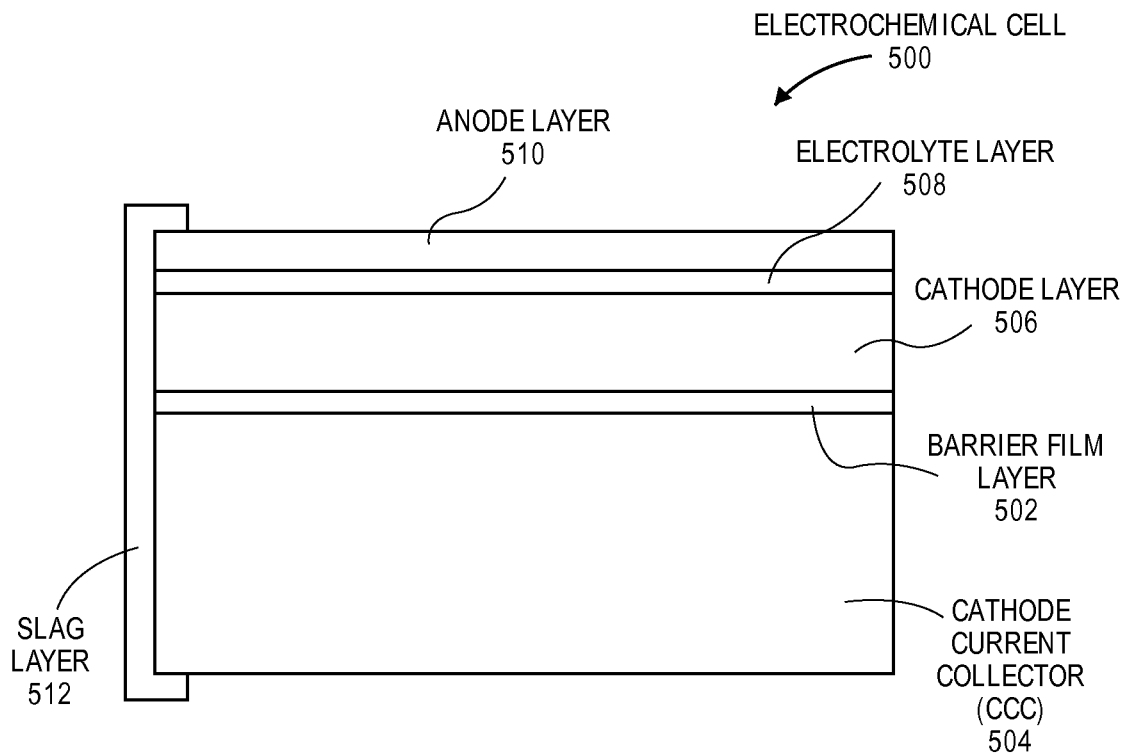
FIG. 5 is a side view of an electrochemical cell in accordance with an embodiment.

Referring to FIG. 5, a side view of an electrochemical cell is shown in accordance with an embodiment. The electrochemical cell 500 may include an electrolyte layer 508 between an anode layer 510 and a cathode layer 506. The cathode layer 506 may, for example, include LiCoO2, LiMn2O4, LiMnO2, LiNiO2, LiFePO4, LiVO2, or any mixture or chemical derivative thereof. The electrolyte layer 508 may facilitate ion transfer between the cathode layer 506 and the anode layer 510. Accordingly, the electrolyte layer 508 may be a solid electrolyte, which may not contain any liquid components and may not require any binder or separator materials compounded into a solid thin film. For example, the electrolyte layer 508 may include lithium phosphorous oxynitride (LiPON) or other solid state thin-film electrolytes such as $LiAlF_4$, $Li_3PO_4$ doped $Li_4SiS_4$. The anode layer 510 may, for example, include lithium, lithium alloys, metals that can form solid solutions or chemical compounds with lithium, or a so-called lithium-ion compound that may be used as a negative anode material in lithium-based batteries, such as $Li_4Ti_5O_{12}$.

In an embodiment, the cathode layer 506 may be electrically connected with a cathode current collector 504, which may be an electrically conductive layer or a tab. Similarly, the anode layer 510 may be electrically connected with an anode current collector, which may be an electrically conductive layer or a tab. Optionally, one or more intermediate layers may be disposed between the cathode layer 506 or the anode layer 510 and a respective current collector. For example, a barrier film layer 502 may separate the cathode layer 506 from the cathode current collector 504. For example, the barrier film layer 502 may be in direct physical contact with the cathode layer 506 and the cathode current collector 504. The barrier film layer 502 may reduce the likelihood of contaminants and/or ions from diffusing between the cathode current collector 504 and the cathode layer 506. Thus, the barrier film layer 502 may include materials that are poor conductors of ions, such as borides, carbides, diamond, diamond-like carbon, silicides, nitrides, phosphides, oxides, fluorides, chlorides, bromides, iodides, and compounds thereof. Alternatively, an additional intermediate layer, such as a substrate layer, e.g., substrate layer 102, may be disposed between the cathode layer 506 and the cathode current collector 504. The substrate layer may, for example, provide electrical connectivity between the cathode layer 506 and the cathode current collector 504 and may also provide structural support, e.g., rigidity, to the electrochemical cell 500. Accordingly, the substrate layer may include a metal foil or another electrically conductive layer.

In some instances, the electrochemically active layers of the cell may be formed on one side of the substrate layer, e.g., using material deposition techniques such as physical vapor deposition, and the cathode current collector 504 may be formed separately and physically coupled to another side of the substrate layer. In other instances, the electrochemically active layers of the cell may be formed on the substrate layer, and then the electrochemically active layers may be removed from the substrate layer and physically coupled to the separately formed cathode current collector 504. In still other instances, the electrochemically active layers of the cell may be formed, e.g., physical vapor deposited, directly on the cathode current collector 504. Thus, there are many different ways to create an electrochemical cell 500 having several electrochemically active layers.

The layers of the electrochemical cell 500 may be thin. For example, the cathode current collector layer 504 may have a thickness in a range of between 10 to 100 μm, e.g., 50 μm. The composite electrochemical cell 500 may have a total thickness in a range of between 13 to 300 μm. For example, the barrier film layer 502, cathode layer 506, electrolyte layer 508, and anode layer 510 may combine to have a thickness in a range of between 3 to 290 μm, e.g., 25 μm.

In an embodiment, an electrochemical cell 500 may be provided that includes every layer of electrochemical cell 500. More particularly, the electrochemical cell may include cathode current collector 504, barrier film layer 502, cathode layer 506, electrolyte layer 508, and anode layer 510. During fabrication, the layers may be cut using conventional laser technology to melt through the layers. Accordingly, a slag layer 512 may be redeposited along the laser cut outer edge of electrochemical cell 500.

Figure 6:
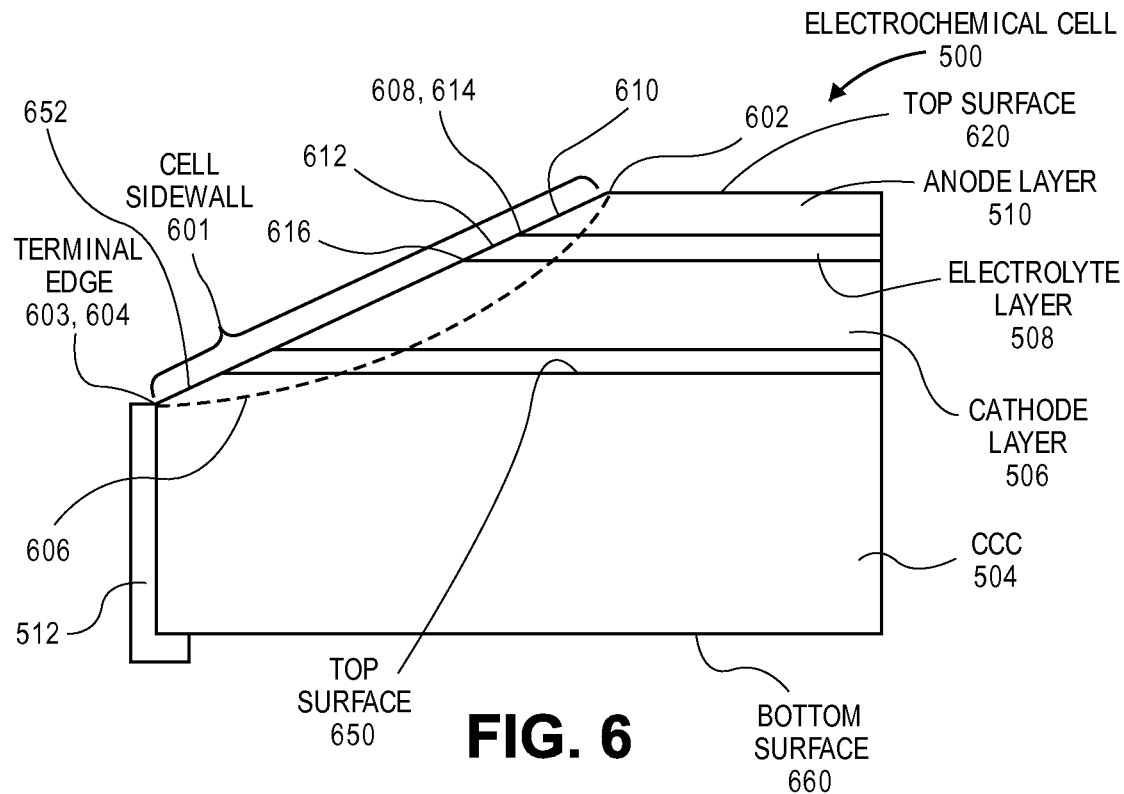
FIG. 6 is a side view of an electrochemical cell having a non-vertical sloped sidewall in accordance with an embodiment.

Referring to FIG. 6, a side view of the electrochemical cell of FIG. 5 is shown, having a non-vertical sloped sidewall in accordance with an embodiment of the invention. In an embodiment, the electrochemical cell 500 may have material removed to form a cell sidewall 601. For example, a portion of the electrochemical cell 500 may be ablated, etched, skived, ground, etc., using "cold cutting" technologies that remove material. Cold cutting is a term that is used broadly to refer to methods that can cut or remove material without melting the materials, but conceivably, slope cell sidewall 601 may be achieved using other cutting methods that employ material melting, and thus, cold cutting is not intended to be limiting of the invention. Nonetheless, the viable options for selectively and controllably eliminating material without melting include laser ablation, which is to be distinguished from laser cutting that produces slag layer 512. More particularly, in a laser ablation process, a low-energy, short wavelength, and/or defocused laser beam may remove portions of one or more layers of material from the electrochemical cell 500 without melting and redepositing slag. As a result of the laser ablation process, at least a portion of the resulting slag layer 512 may be removed across the cut surface as seen in FIG. 6, thereby reducing the likelihood of electrical shorting between cell layers, e.g., the anode layer 510 and the cathode layer 506.

The cell sidewall 601 may be formed along the cut surface. In an embodiment, the cell sidewall 601 includes respective sidewalls of one or more layers of the electrochemical cell 500. For example, the cell sidewall 601 may extend along a non-zero, non-vertical slope between a top surface 620 of the anode layer 510 to (and optionally including portions of) the cathode current collector 504. That is, the cell sidewall 601 may extend outwardly from anode top edge 602 of top surface 620 to a terminal edge 603. Terminal edge 603 may represent a location at which the taper of cell sidewall ends and a lateral side of electrochemical cell transitions to an infinite, vertical slope. For instance, terminal edge 603 may coincide with slag layer top edge 604, which is an upper location along the vertical wall formed by laser cutting electrochemical cell 500. Thus, in an embodiment, the cell sidewall 601 may include a non-vertical slope between a top edge, e.g., anode top edge 602 and a bottom edge, e.g., terminal edge 603 coinciding with slag layer top edge 604. That is, the cell sidewall 601 may be sloped and a height (in a vertical direction) of the cell sidewall 601 diminishes along a transverse direction orthogonal to the vertical direction. More particularly, the cell sidewall 601 height may diminish in a transverse direction outwardly from an anode top surface having the anode top edge 602 toward the terminal edge 603. The height of the cell sidewall 601 may diminish at a higher or lower rate, however, in an embodiment, the cell sidewall 601 includes a non-vertical slope and the diminution of the height does not occur at an infinite rate as in the case of a vertical sidewall.

Given that the slope of cell sidewall 601 may vary, and also given that cell sidewall 601 may be formed by removing material from electrochemical cell 500 using an ablation process that can be varied to ablate the cell to a desired depth, it will be appreciated that terminal edge 603 of cell sidewall 601 may be located along a sidewall of any of the constituent layers of electrochemical cell 500. For example, cathode current collector 504 may have a top surface 650 electrically connected to cathode layer 506 (cathode layer 506 may be over the top surface 650 and on cathode current collector 504). By varying the depth that material is removed using an ablation process, terminal edge 603 may terminate at locations more or less offset from the top surface 650 of cathode current collector 504. For example, as shown in FIG. 6, terminal edge 603 may be offset in the vertical direction from top surface (and below top surface 650). When terminal edge 603 is below top surface 650 along cell sidewall 601, the cathode current collector includes a cathode current collector sidewall 652 that is exposed due to the removal of material using the ablation process. The cathode collector sidewall 652 may be contiguous with the other exposed sidewall portions, as described below, to form the non-zero, non-vertical slope of cell sidewall 601.

Less material may be removed during the ablation process to form a shallower cut. Accordingly, the terminal edge may coincide with top surface 650. That is, cell sidewall 601 may extend along a non-zero, non-vertical slope from anode top edge 602 to terminal edge 603 at top surface 650. In such case, since the ablation cut does not extend below top surface 650 of cathode current collector 504, electrochemical cell 500 may lack a cathode current collector sidewall 652.

Figure 7:
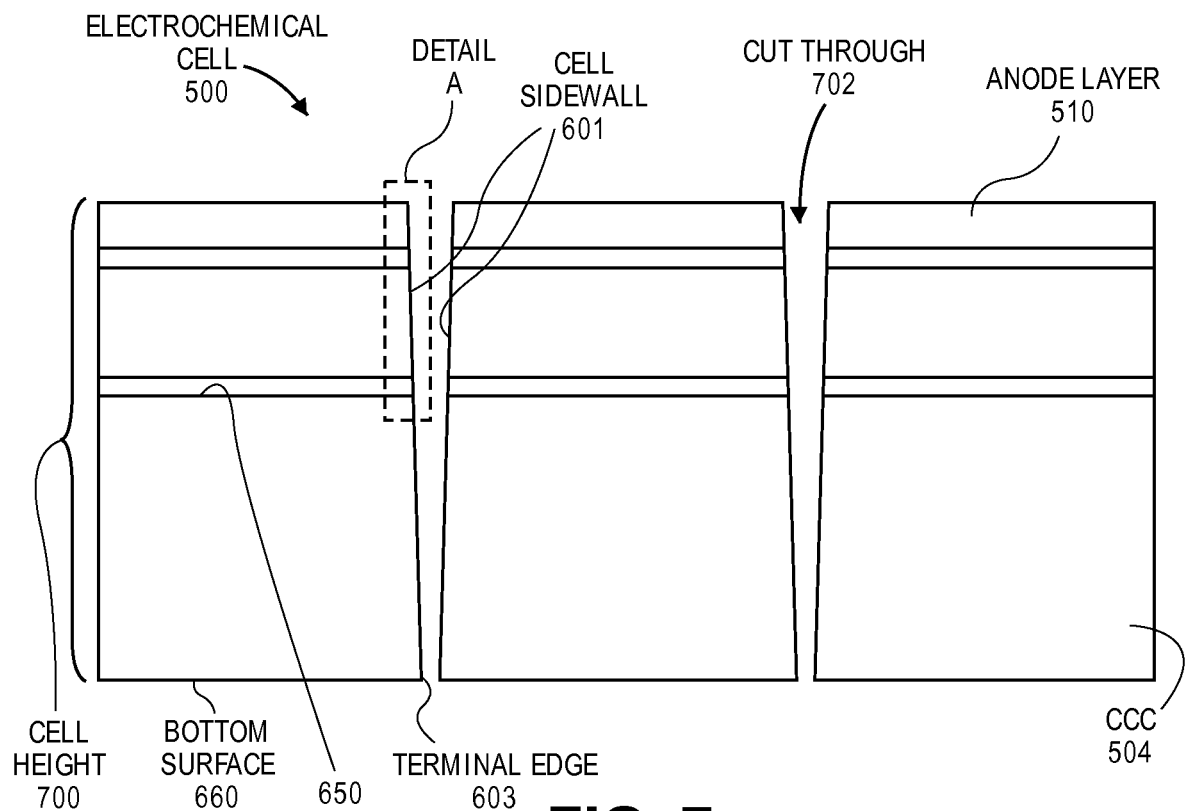
FIG. 7 is a side view of several singulated electrochemical cells formed from a sheet of multi-layered material in accordance with an embodiment.

In an embodiment, cathode current collector 504 includes a bottom surface 660 below top surface 650. Furthermore, the ablation process may be varied to remove material across an entire cell height 700 (see FIG. 7) of electrochemical cell 500. That is, as shown in FIG. 7, cut trough 702 may be driven through electrochemical cell 500 to form cell sidewall 601 extending from anode top edge 602 at anode top surface 620 to terminal edge 603 at bottom surface 660. Thus, cell sidewall 601 may include an exposed cathode current collector sidewall 652 sloping from top surface 650 to terminal edge 603 at bottom surface 660, as shown in FIG. 7.

In an embodiment, as shown below in the electrochemical device embodiments of FIGS. 10-11, terminal edge 603 may be a transition point at which cell sidewall 601 changes to a zero, horizontal slope. For example, cell sidewall 601 may slope from anode top edge 602 to terminal edge 603 below top surface 650 of cathode current collector 504. Accordingly, cell sidewall 601 may include the exposed sidewalls of anode layer 510, electrolyte layer 508, cathode layer 506, and cathode current collector 504. The ablation cut depth may be shallower, however, than cell height 700, and thus, a horizontal upper surface is formed at the bottom of the ablation cut. This horizontal upper surface (indicated, in an embodiment, as exposed cathode current collector surface 1102 in FIG. 11) may extend from terminal edge 603 to a lateral side of cathode current collector 504. As such, rather than being a point at which cell sidewall 601 transition to a vertical surface (e.g., the lateral surface apposed with slag layer 512 in FIG. 6) or a point at which cell sidewall 601 transitions to bottom surface 660 (see FIG. 7), terminal edge 603 may be a point at which cell sidewall 601 along a side of an ablation cut transitions into a horizontal surface along a base of the ablation cut.

In an embodiment, the cell sidewall 601 is contiguous across its length. For example, in an embodiment, the cell sidewall 601 tapers between the anode top edge 602 and the slag layer top edge 604, as seen in FIG. 6 (which shows an exaggerated taper). The respective sidewalls of the anode layer, electrolyte layer, and cathode layer along the non-vertical slope may be partially or wholly planar. Accordingly, the non-vertical slope may include a linear slope portion. Thus, a slope of cell sidewall 601 may be consistent across all layers of electrochemical cell 500. That is, the ablated wall having the slope, i.e., cell sidewall 601, may have a continuous and linear slope from anode top edge 602 to slag layer top edge 604.

Rather than having a continuous and linear slope, as shown by a dotted line in FIG. 6, the non-vertical slope may be contiguous but instead have a curvilinear portion. For example, curvilinear slope portion 606 may follow a curvilinear path, e.g., an arc, between the anode top edge 602 and the slag layer top edge 604. In an embodiment, the curvature or shape of the cell sidewall 601 may be controlled by defocusing a laser beam used for ablation. For example, the laser beam may be defocused to cause a taper of an ablated sidewall to have a taper run, i.e., a distance covered by the cell sidewall 601 in a direction orthogonal to the vertical direction, of between 5-50 μm, e.g., 20 μm. The laser beam intensity and focus may be controlled to create any range of cut surface geometries.

Given that the ablated surface of cell sidewall 601 may be contiguous, each layer of the electrochemical cell 500 may include a top edge and a bottom edge, and the top edge of a first layer may be coincident with the bottom edge of a second layer stacked over the first layer. For instance, the anode layer 510 may have an anode sidewall 610 between the anode top edge 602 and the anode bottom edge 608. Furthermore, the anode layer bottom edge 604 may be laterally offset, i.e., in a transverse direction orthogonal to a vertical direction and outwardly away from a top surface of the anode top surface and the anode top edge 602. Similarly, the electrolyte layer 508 between the anode layer 510 and the cathode layer 506 may have an electrolyte sidewall 612 between an electrolyte top edge 614 and an electrolyte bottom edge 616, e.g., at the cathode layer 506. In an embodiment, the electrolyte top edge 614 is coincident with the anode bottom edge 608, which may make a smooth transition between the sidewalls of the two layers. It is to be understood that a smooth transition does not imply that a tangent of the respective merging sidewalls are parallel, but rather, one sidewall may be angled with respect to the other sidewall. If the edges of the sidewalls are essentially coincident at the transition between layers, then the transition may be considered to be smooth. Similarly, a top edge of the cathode layer 506 may be coincident with the electrolyte bottom edge 616, and so on. Accordingly, the sidewalls of all layers are contiguous and continuous over the ablated, or otherwise formed, cell sidewall 601 surface. Referring to FIG. 7, a side view of several singulated electrochemical cells formed from a sheet of multi-layered material is shown in accordance with another embodiment of the invention. This structure may be, but is not necessarily, the result of a low-energy, short wavelength, and/or defocused laser beam having been used to cut fully through a multilayered sheet of material, but without melting and redepositing the material to create the slag layer 512. In other words, rather than singulating the electrochemical cells 500 by melting through the sheet with a typical laser cutting process and then ablating the sidewalls to remove the slag layer 512, the sheet may instead be singulated using a cold cutting technology, e.g., a laser ablation process, that removes material without melting and redepositing the material in the first place. The sheet of multi-layered material may be singulated using an ablation laser, e.g., a laser that has been tuned for ablation rather than for cutting. The intensity of the laser beam may also be adjusted to reduce the taper angle shown in the figure, while driving a cut trough 702 fully through the sheet, from the anode layer 510 down through the cathode current collector 504. Such cutting through ablation, rather than melting, may mitigate or even reduce the likelihood of slag redeposition along the resulting cut edge and also the top surface of the singulated cells. The cutting tool, e.g., a laser beam, may be used to generate a gap between adjacent cell sidewalls where material has been removed. Furthermore, the gap may be defined between the cell sidewalls 601, and each cell sidewall 601 may include a non-vertical sloped surface, e.g., the slope may include at least a planar or curvilinear slope portion. Note that ablation is only one manner of creating a contiguous sloped surface without melting and redepositing the cut or removed material, and thus, is not limiting of the invention. Furthermore, other embodiments may allow for typical laser cutting technologies to melt through layers of an electrochemical cell and to still create the non-vertical sloped sidewall surface described herein.

Figure 4:
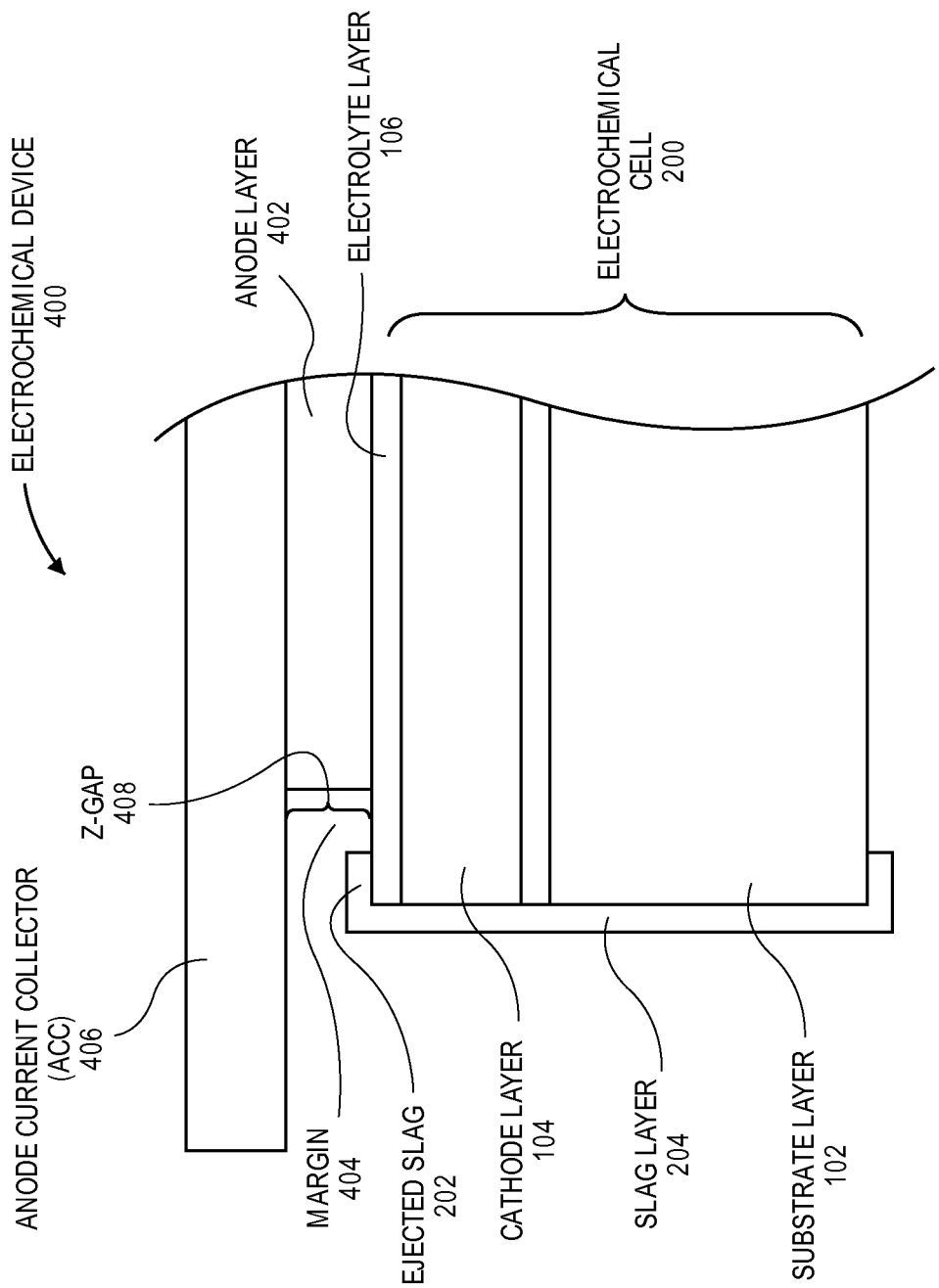
FIG. 4 is a partial side view of an electrochemical device.
Figure 8:
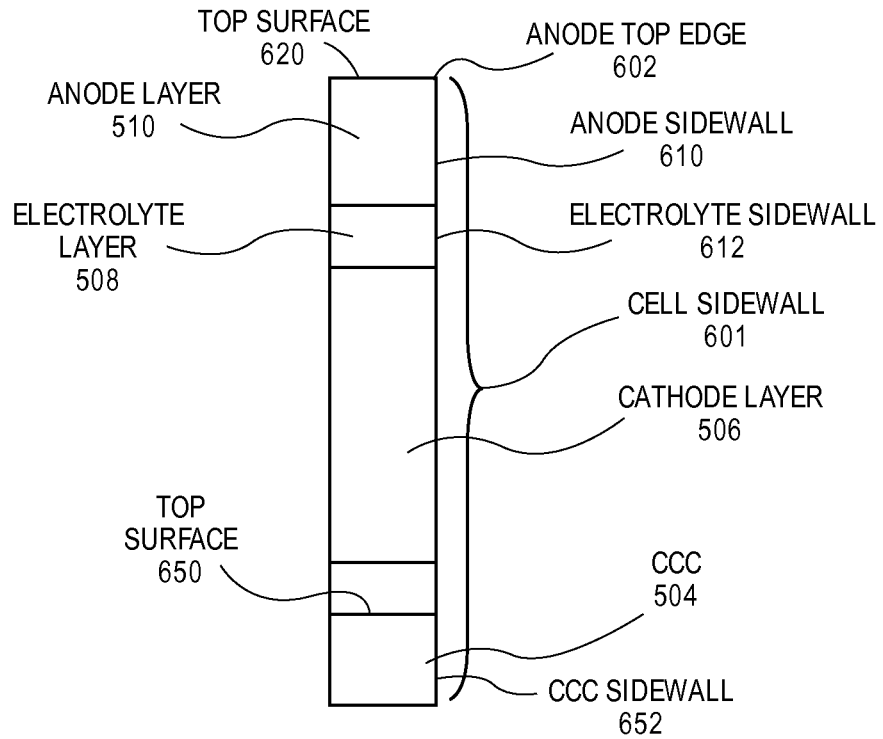
FIG. 8 is a detail view, taken from Detail A of FIG. 7, of an edge of a singulated electrochemical cell in accordance with an embodiment.

Referring to FIG. 8, a detail view, taken from Detail A of FIG. 7, of an outer edge of a singulated electrochemical cell is shown. The cut may leave a contiguous taper from the anode top edge 602 through every layer from the anode layer 510 down through the cathode current collector 504. A slope of cell sidewall 601 along the ablation cut may be consistent across all layers of electrochemical cell 500. That is, the ablated wall having the slope, i.e., cell sidewall 601, may have a continuous and linear slope from anode top edge 602 to a bottom edge of the layer forming cathode current collector 504. Thus, each layer of the singulated electrochemical cell 500 may include a sidewall that transitions smoothly into an adjacent layer sidewall. In an embodiment, for each layer sidewall the top and bottom edges are coincident with adjacent sidewall edges, meaning that there may be essentially no discontinuity as the sidewalls transition from one layer to the next. This is in contrast to what is shown in FIG. 4, where a margin 404 is formed between the sidewalls of the adjacent anode layer 402 and electrolyte layer 106.

As a result of the processes and electrochemical cell structures described above, a proportion of the cathode layer 506 having anode layer 510 overlying it, may be increased. The proportion may vary based on an angle of the sidewall slope, but for any given slope angle, the proportion may be maximized. That is, for any given sidewall slope, the anode layer 510 may extend fully to a lateral edge of the electrochemical cell 500, i.e., there may be little or no margin between an electrolyte sidewall 612 and an anode sidewall 610. For example, any margin or lateral offset between the sidewalls 610, 612 may be less than a thickness of the anode layer 510, e.g., less than 20 µm. Thus, the electrochemical cell surface area in a direction orthogonal to the vertical direction may be essentially fully utilized and anode area may be maximized. More particularly, the electrochemical cell 500 may have a structure in which practically the entire cathode layer 506 is apposed by an anode layer 510 across from the electrolyte layer 508 as a result of the sidewall having a contiguous slope between the cathode layer 506 and the anode layer 510. Thus, a bottom surface area of an anode area may be essentially equal to an upper surface area of the cathode layer 506, the difference being determined by the sidewall slope between the areas, resulting in substantially no virtual leak observed in the cathode as the electrochemical cell 500 goes through chemical equilibrium at rest. By maximizing the proportion of cathode having anode overlying it in this way, an increase in performance of up to 20% may be achieved over masking methodologies that form a margin between the anode and cathode edges, as described with respect to FIG. 4 above. In addition to improving battery performance, a contiguous sidewall surface with a maximized anode surface area may also be more manufacturable, since no masking is required. In the case of singulating electrochemical cells using a cold cutting technology, e.g., laser ablation, as opposed to masking and laser cutting, cut trough may have closer tolerances or be narrower than may be achieved with masking. This may reduce material waste and manufacturing cost, as compared to existing masking and patterning techniques, which are generally too flimsy or time-consuming to achieve such thin cut troughs 702.

As described above, in an embodiment, cold cutting to singulate an electrochemical cell 500 from a sheet of multilayered material, or to pattern or ablate the electrochemical cell 500, e.g., to remove the slag layer 512 to reduce the likelihood of shorting between layers, may be achieved using an ablation laser. A laser beam in a wavelength spectrum below 550 nm may be used to ablate and remove material from the sheet or electrochemical cell 500. For example, a green or ultraviolet wavelength laser beam having a wavelength of 530 nm may be used to ablate the one or more layers of electrochemical cell 500. Furthermore, an intensity of the short wavelength laser beam may be controlled to reduce the likelihood of melting of the material layers. That is, the intensity of the laser beam may be controlled to generate heat that is absorbed in the multilayered material, causing ablation of the material rather than melting of the material. In an embodiment, laser beam intensity may be controlled by adjusting a power setting of the laser beam.

Intensity of the laser beam used to ablate the multilayered sheet may also be controlled by adjusting a focal area of the laser beam. More specifically, the laser beam may be defocused. Accordingly, the focal area at the surface of the multilayered sheet is increased, thereby reducing laser beam intensity at a given point. In an embodiment, defocusing the laser beam changes the geometry of the resulting cut surface, and thus, the cell sidewall 601 slope angle or shape. For example, as the laser beam is further defocused, a taper angle of the cell sidewall 601 may increase. That is, defocusing the laser beam may create a larger taper run.

Figure 9:
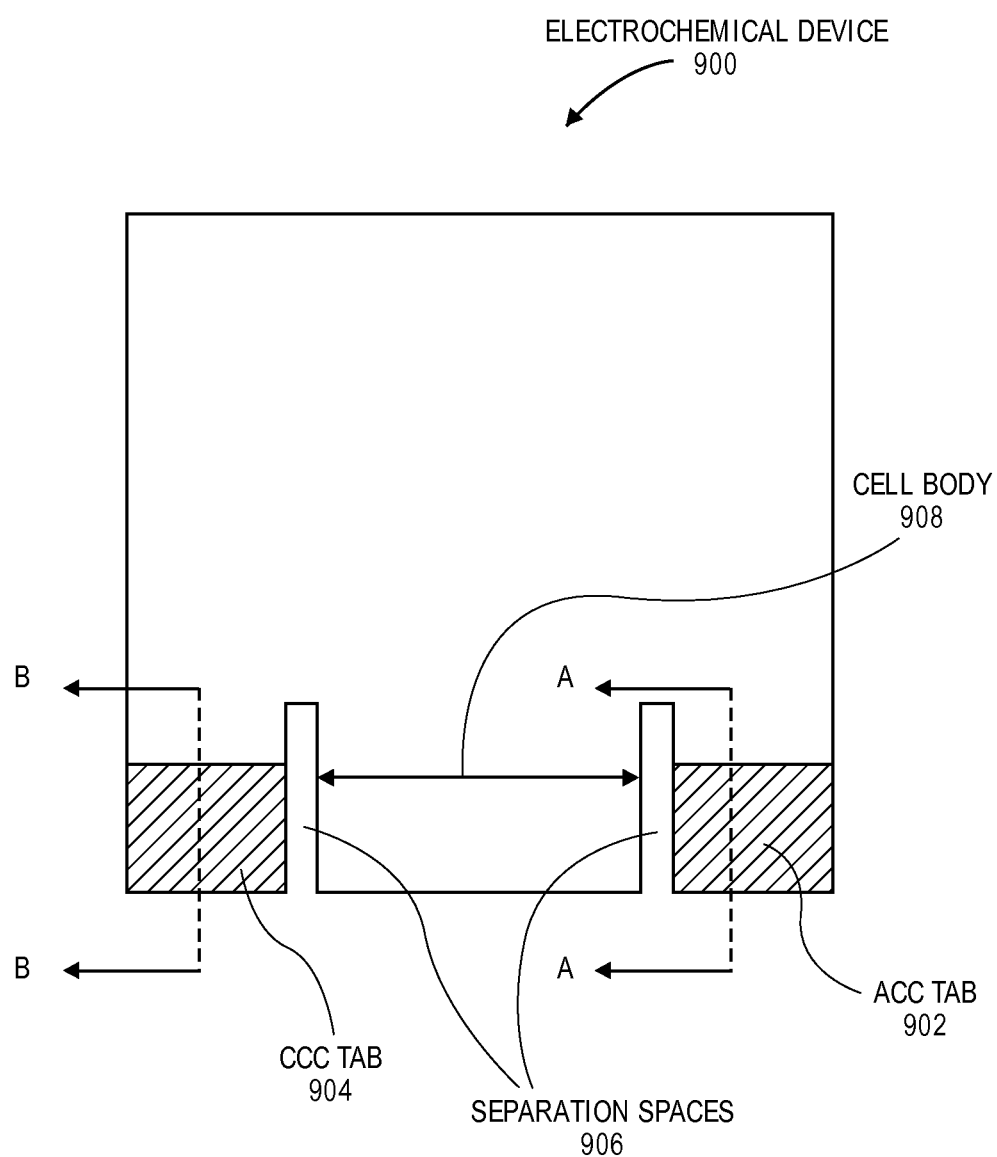
FIG. 9 is a top view of an electrochemical device having current collector tabs in accordance with an embodiment.

Referring to FIG. 9, a top view of an electrochemical device having current collector tabs is shown in accordance with an embodiment. In an embodiment, an electrochemical device 900 may be manufactured to include current collector tabs, e.g., an anode current collector tab 902 and a cathode current collector tab 904. More particularly, an electrochemical device 900 may be formed that includes at least two electrochemical cells 500. In an embodiment, each electrochemical cell 500 includes an anode layer 510, an electrolyte layer 508, a cathode layer 506, and a cathode current collector 504, as described above. Each cell may, but need not, maximize the proportion of cathode area having an anode area overlying it, by incorporating a contiguously sloped sidewall having essentially no margin between layers that are immediately next to one another. In an embodiment, the architecture includes tabs that can fit within an outer boundary of the electrochemical cell 500, e.g., within a square or rectangular cell profile when viewed from above. This fit provides for efficient packaging that may be more easily incorporated into products. In an embodiment, separation spaces 906 may be provided between the tabs 902, 904 and an adjacent cell body 908 to reduce the likelihood that electrical and/or ionic shorting will occur between the sides of the tabs and any of the layers, e.g., a sidewall of the anode layer, cathode layer, or electrolyte layer, that may be exposed and facing the tab sides.

Figure 10:
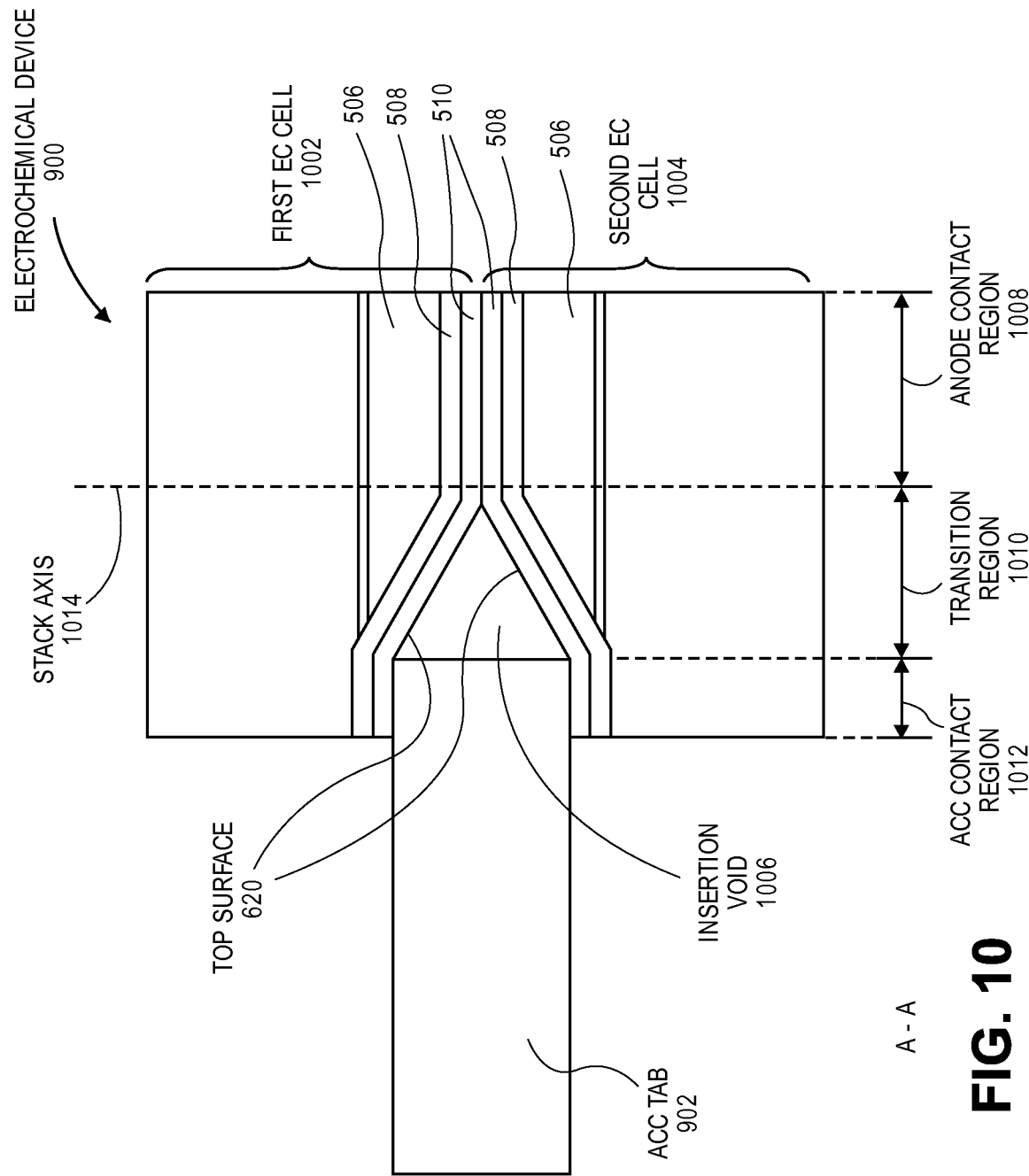
FIG. 10 is a cross-sectional view, taken about line A-A of FIG. 9, of an electrochemical device having an anode current collector tab in accordance with an embodiment.

Referring to FIG. 10, a cross-sectional view, taken about line A-A of FIG. 9, of an electrochemical device having an anode current collector tab is shown. In one embodiment, the electrochemical device 900 includes a stack of electrochemical cells 500. For example, a first electrochemical cell 1002 may be inverted and stacked on a second electrochemical cell 1004 such that respective anode layers 510 of the electrochemical cells 1002, 1004 face one another.

In an embodiment, the electrochemical device 900 includes an insertion void 1006 to receive an anode current collector tab 902 between the anode layers 510, without increasing z-height of the assembled device. More particularly, the electrochemical cells 500 may be formed such that after assembly, a gap or opening is provided near an edge of the electrochemical device 900 to receive the anode current collector tab 902. The anode layers 510 over the majority of the electrochemical device's transverse area, e.g., over a medial portion of the electrochemical device, may be either adjacent or abutted with one another. For example, the anode layers may be immediately next to each other, e.g., in physical contact with each other, over at least a portion of their respective areas. Alternatively, there may be a thin separation layer between the anode layers, such as an electrically and/or ionically insulating layer. The separation layer may have a thickness less than a height of gap or opening provided to receive the anode current collector tab 902. Thus, in an embodiment, z-height may be reduced, even though it may not be reduced to zero. In addition to reducing z-height, the device architecture may allow for thicker tabs to be used, which may increase the robustness of the tabs and make electrical and physical connections to external components more reliable.

Each electrochemical cell 500 may include an anode current collector contact region 1012 near an outer perimeter or sidewall. The anode current collector contact regions 1012 may be separated by a distance in the stack direction sufficient to receive anode current collector tab 902. For example, anode current collector tab 902 may be inserted such that a distal end extends inward from the sidewall of the cells. The inner surface of the cells along the anode current collector contact region 1012 may transition, e.g., taper, over a transition region 1010. That is, in an embodiment, top surface 620 of respective anode layers 510 of the stacked electrochemical cells may taper along a non-zero, non-vertical slope across transition region 1010. More particularly, the separation between cell inner surfaces may reduce over the transition region 1010. As a result, a gap may exist between inner surfaces of the cells over transition region 1010, since the anode current collector tab 902 may be thicker than the separation distance, and thus, not extend into the transition region. Note that the taper over the transition region 1010 as shown in FIG. 10 is exaggerated, and that a taper run of the transition region may be a fraction of the taper rise. In an embodiment, the taper may be essentially vertical, but may include a non-zero slope, such that the transition region 1010 is very small, and the anode current collector contact region 1012 is essentially directly next to the anode contact region 1008.

Note that the taper over transition region 1010 may include a vertical rise, and thus, the anode contact region 1008 of each electrochemical cell may be offset in the stack direction from the respective anode current collector contact region 1012 of the cell. Over the anode contact region 1008, a separation between the inner surfaces of the cells may be less than over the anode current collector contact region 1012. That is, the cells may be separated less over a medial portion, i.e., inward from the transition region 1010, than over an edge region, i.e., over the anode current collector contact region 1012. In one embodiment, a separation distance between the inner surfaces of the cells over the anode contact region 1008 may be essentially zero and the separation distance between the inner surfaces of the cells over the anode current collector contact region 1012 may be equal to a thickness of the anode current collector 902. Thus, an insertion void may be formed between cells over both anode current collector contact region 1012 and transition region 1010. Accordingly, the respective anode layers over the anode contact region 1008 may be directly in electrical contact. Alternatively, the anode layers may be placed in electrical contact through an electrically conductive material that is also running in a same direction as one or more of the anode layers over the anode contact region 1008, e.g., horizontally or transversely.

In an embodiment, the separation between the inner surfaces of the cells over the anode current collector contact region 1012 may be formed by removing a portion of one or more of the respective cathode layers 506 of first electrochemical cell 1002 and second electrochemical cell 1004. More particularly, the cathode material may be removed at the periphery of the cell to make space for the anode current collector tab 902. Another way to describe this is that a notch or slot has been formed in a cell sidewall where at least two stacked cells are joined. Forming such a gap feature may result in the inner surface of the cell, which is located in the notch, to be lined with anode layer material that is electrically in contact with both of the respective cell anode layers 510 (and an anode current collector tab 902 placed within the gap feature may therefore be in contact with those anode layers).

For completeness of understanding of the above description, another way to describe an embodiment of the electrochemical device 900 is as follows. While the anode layer, the electrolyte layer, and the cathode layer, in a conventional structure, all run horizontally outward, essentially as transverse layers, until they end at the same distance, thereby defining a vertical cell sidewall as seen in FIG. 5 for example, the cathode layer 506, in accordance with an embodiment of the invention, stops short (does not run all the way out to the cell sidewall as otherwise defined by the side or periphery of a substrate). This in effect creates a gap in the cell sidewall (making up all or part of an insertion void 1006). The electrolyte layer 508 and the anode layer 510, however, continue to run and conform to the surface of the cathode 506 in the gap, as seen in FIG. 10. The gap need not have any particular shape, but it may be large enough to allow an anode current collector tab 902 to be positioned at least partially inside so as to make electrical contact with the anode layers 510. The anode current collector tab 902 may therefore fill the insertion void 1006 between the anode current collector contact regions 1012 of the anode layers, i.e., may fill a distance in the stack direction between the anode current collector contact region on an anode layer and a top surface of an opposing anode layer.

It will be appreciated that the embodiment represented in FIG. 10 illustrates a "balanced" insertion void 1006, when equal amounts of cathode layer 506 are absent over an edge region of the stacked cells. However, the contribution to the insertion void 1006 may alternatively be imbalanced, where, for example, only the cathode layer 506 of first electrochemical cell 1002 is absent or notched out over the edge region (which may encompass the anode current collector contact region 1012 and the transition region 1010) while the other cathode layer 506 of second electrochemical cell 1004 (and its anode layer 510 and electrolyte layer 508) may extend continuously transverse across those regions, i.e., without showing any vertical offset. Accordingly, an anode current collector 902 with half the thickness may still fit within such an imbalanced insertion void 1006. In the case of either a balanced or an imbalanced insertion void 1006, the insertion void 1006 may have a distance, e.g., a height in the stack direction of stack axis 1014, that is at least as far as the offset in the stack direction between the top surface 620 along anode contact region 1008 and the top surface 620 along anode current collector contact region 1012.

The anode current collector tab 902 may be inserted into the insertion void 1006 and physically coupled with the inner surface of the cells over the anode current collector contact region 1012. For example, anode layers 510 of the electrochemical device may extend over the anode current collector contact region, and thus, the anode layers 510 may be bonded to the anode current collector 902. A physical connection between the anode current collector tab 902 and the anode layers 510 may be made in various manners, including by using an adhesive, e.g., a conductive pressure sensitive adhesive, to create an adhesive bond between surfaces of the physically connected components. Alternatively, a friction fit between the anode current collector tab 902 and the anode layers 510 may be formed. Furthermore, other techniques, such as thermal welding of the anode current collector tab 902 to the anode layers 510 may be used.

In an embodiment, only one of the electrochemical cells in an electrochemical device 900 includes anode current collector contact region 1012 offset from the anode contact region 1008. That is, a recess may be formed in only one electrochemical cell to provide an insertion gap 1006 for insertion of an anode current collector tab 902. Furthermore, it is not necessary that one or more layers of the electrochemical cells extend fully to the perimeter of the cell, as shown in FIG. 10. For example, one or more of the respective anode layers 510 in the electrochemical device 900 may not extend fully over the anode contact region 1008 and the anode current collector contact region 1012. For example, the anode layer 510 may extend over the anode contact region 1008 without also extending over the transition region 1010 or the anode current collector contact region 1012. Nonetheless, electrical contact may be made between those regions to permit an inserted anode current collector tab 902 to be electrically connected to an anode layer 510 over a portion of the anode contact region 1008. For example, an electrically conductive layer, lead, via, etc., may be used to form an electrical connection between the anode current collector contact region 1012 and the anode material within the anode contact region 1008. Thus, illustration of the anode layer 510 extending fully between and over regions 1008, 1012 over transition region 1010 is not intended to be limiting of the invention. Rather, electrochemical cells with different architectures may be used if a separation distance between the electrochemical cells is higher over a region 1012 than at a region 1008 to allow for insertion of a current collector tab without increasing z-height.

Figure 11:
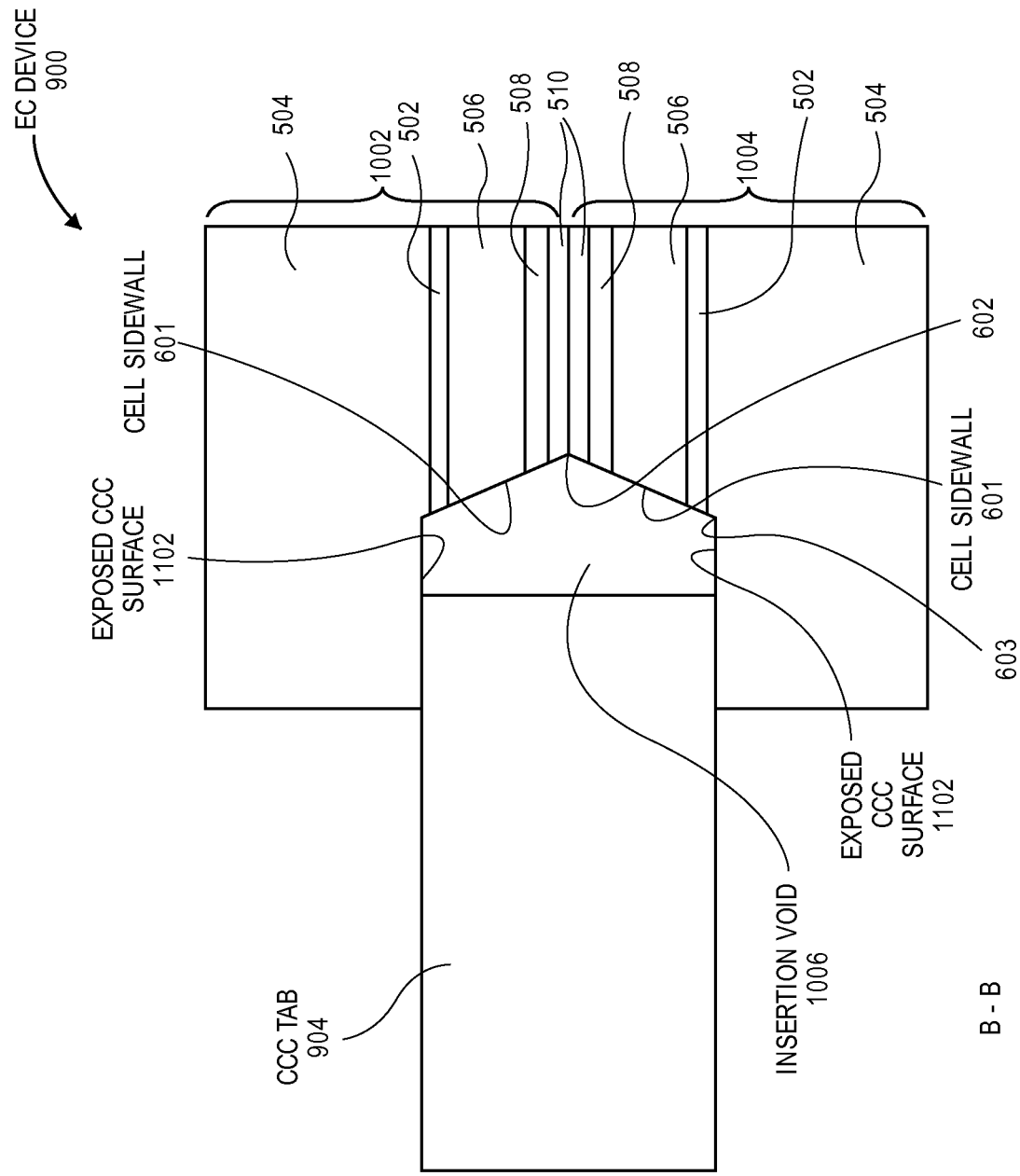
FIG. 11 is a cross-sectional view, taken about line B-B of FIG. 9, of an electrochemical device having a cathode current collector tab in accordance with an embodiment.

Referring to FIG. 11, a cross-sectional view, taken about line B-B of FIG. 9, of an electrochemical device having a cathode current collector tab is shown in accordance with an embodiment. In an embodiment, the electrochemical device 900 includes an insertion void 1006 to receive a cathode current collector tab 904, between the cathode current collectors 504, without increasing z-height of the assembled device. More particularly, the electrochemical cells 500, i.e., first electrochemical cell 1002 and second electrochemical cell 1004, may be formed such that after assembly, a gap or opening is provided near a perimeter region of the electrochemical device 900 that receives the cathode current collector tab 904. The gap or opening may be the result of vertically recessed surfaces in one or both of the mating electrochemical cells 1002, 1004. That is, one or both of the electrochemical cells 1002, 1004 may include recessed substrate surfaces 1102 as described further below. Thus, each electrochemical cell 500 may include respective exposed cathode current collector surfaces 1102 facing one another and located laterally outside of the various other layers of the cell. The cathode current collector surfaces 1102 facing one another to make electrical contact with an inserted current collector are exposed because they may not be covered by the other layers of the electrochemical cell 500. The various other layers, e.g., the barrier film layer 502, the cathode layer 506, the electrolyte layer 508, and the anode layer 510, of each electrochemical cell 500 in the stack, may include a cell sidewall 601 that is contiguous, and may include a non-zero, non-vertical slope, as described above. Thus, the cathode layer 506 may be essentially fully covered by an overlying anode layer 510 to increase energy density. The cathode current collector tab 904 may be inserted into the insertion void 1006 and bonded to the cathode current collectors 504 of the electrochemical device using, e.g., a conductive pressure sensitive adhesive. The cathode current collector tab 904 may contact the exposed surface of the cathode current collectors 504, i.e., may be in direct contact with the cathode current collectors 504, to facilitate electrical conductivity therebetween. Furthermore, the cathode current collector tab 904 may fill the insertion void 1006 to fully utilize lateral and vertical space within the electrochemical device. This may allow for the tab to fit within the outer boundaries of the stack. It should be clarified that by fitting within the outer boundaries of the stack, it is meant that the tab may extend outward and away from a contact point between cells of the electrochemical device 900 and that the shape of the tab fills in or defines an outer boundary of the stack that may be recognized as a simple shape. For example, without the tabs in place, the stack may be recognized from above as having a square profile with notched corners, but upon insertion of the tabs, the stack may be recognized as a having a square profile. However, a square profile is provided by way of example only, and in other instances, insertion of the tabs may define an outer boundary of the electrochemical device 900 having any general shape, e.g., any regular convex polygon shape. Accordingly, in an embodiment, an electrochemical device having tabs and an outer boundary with a square profile is achieved.

Advantageously, an electrochemical device having architecture as illustrated in FIGS. 10 and 11 allows for a reduction in a z-height of the electrochemical device, thereby improving material energy density. The reduction in z-height may come at the expense of reducing material in an x- or y-axis direction, i.e., orthogonal to the stack axis 1014, to yield the insertion void 1006, but such reduction in the direction of the x-y plane may be proportionally less impactful in terms of battery performance degradation. Thus, the illustrated electrochemical device architecture may provide a benefit over current electrochemical device architectures that include, e.g., an anode current collector layer between the anode layers 510, which adds additional height to the electrochemical device stack. An example of a manufacturing process for building an electrochemical device structure as shown in FIGS. 9-11 is described further below.

Figure 12:
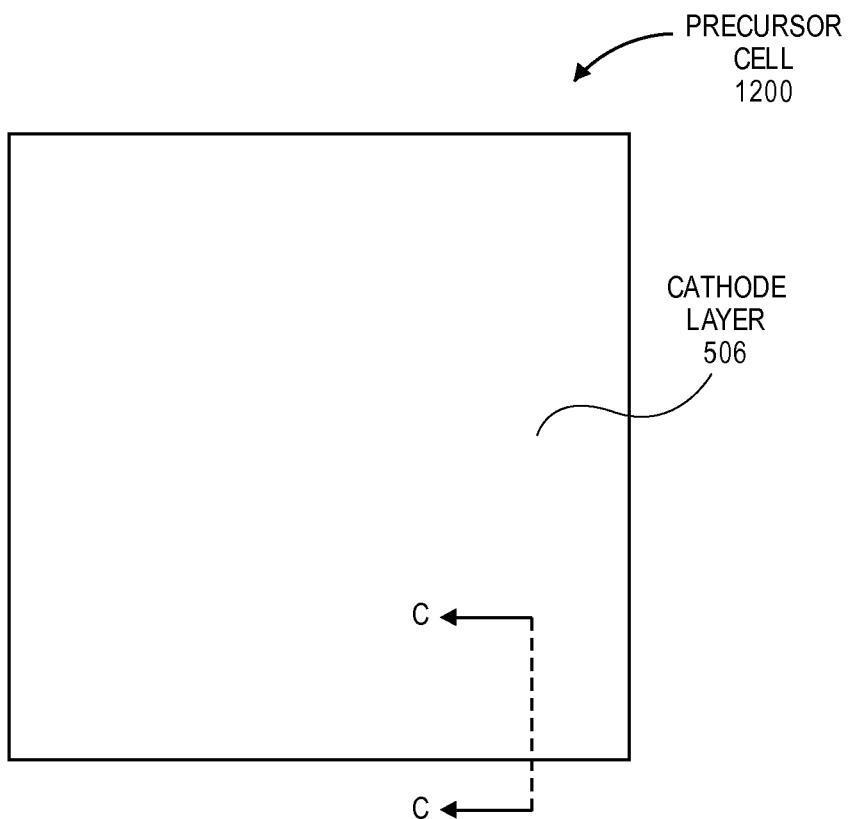
FIGS. 12-21 are various views of an electrochemical device having current collector tabs shown at different stages of a manufacturing process in accordance with an embodiment.

Referring to FIG. 12, a top view of a precursor cell used during the manufacture of an electrochemical device is shown in accordance with an embodiment. A precursor cell 1200 may be provided. The precursor cell may have, e.g., a square or rectangular profile, although the profile may be shaped otherwise. The precursor cell 1200 may be, but is not necessarily, singulated from a sheet of multi-layered material using laser cutting technologies, including an ablation laser for performing a laser ablation process.

Figure 13:
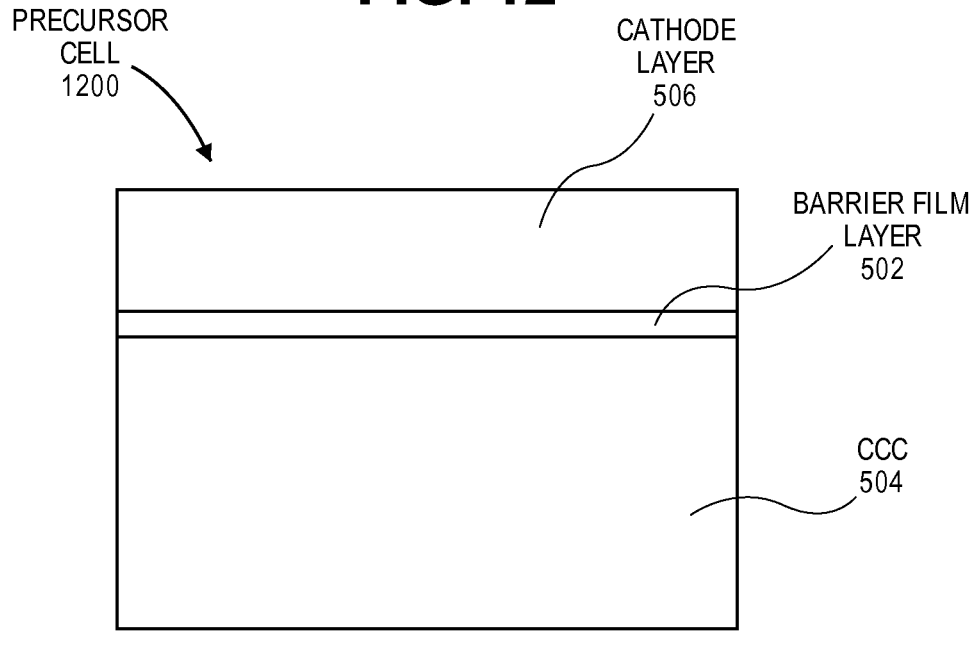

Referring to FIG. 13, a cross-sectional view, taken about line C-C of FIG. 12, of a precursor cell is shown in accordance with an embodiment. The precursor cell 1200 may include the cathode current collector 504, the barrier film layer 502, and the cathode layer 506, having the material and structure described above. Thus, in an embodiment, the precursor cell 1200 represents a state of manufacturing prior to deposition of the electrolyte layer 508 and the anode layer 510. In an embodiment, the precursor cell 1200 has a contiguous sidewall. That is, the sidewall of each layer may be flush with that of another, creating a smooth transition across the entire sidewall face of the cell 1200. The face may have a planar surface and/or a curved surface. Furthermore, in an embodiment, there is no slag layer over the face of the sidewall; this may be achieved using laser ablation as described above, to singulate the precursor cell 1200 from a sheet of multi-layered material.

Figure 14:
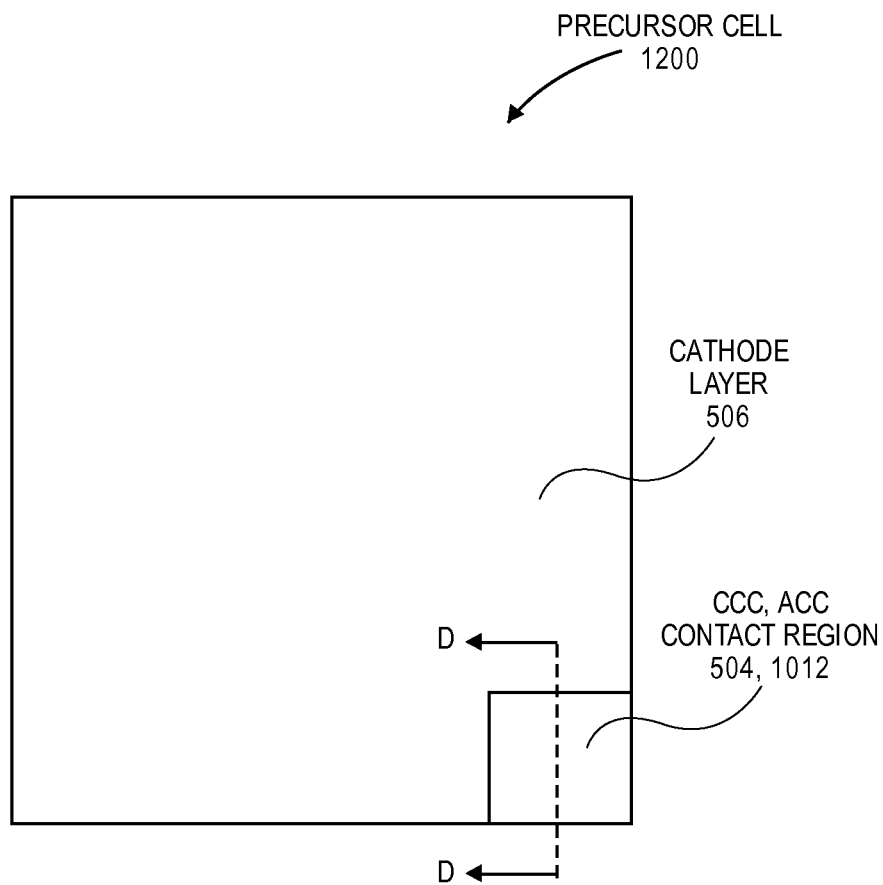

Referring to FIG. 14, a top view of a precursor cell having an ablated anode current collector contact region is shown in accordance with an embodiment. In an embodiment, a cold cutting technology, such as an ablation laser, is used to remove a portion of one or more of the layers of the precursor cell 1200 in an anode current collector contact region 1012. For example, a region having a width and/or length one-tenth of a width of the precursor cell 1200 may be ablated, although other widths and/or lengths are alternatively possible.

Figure 15:
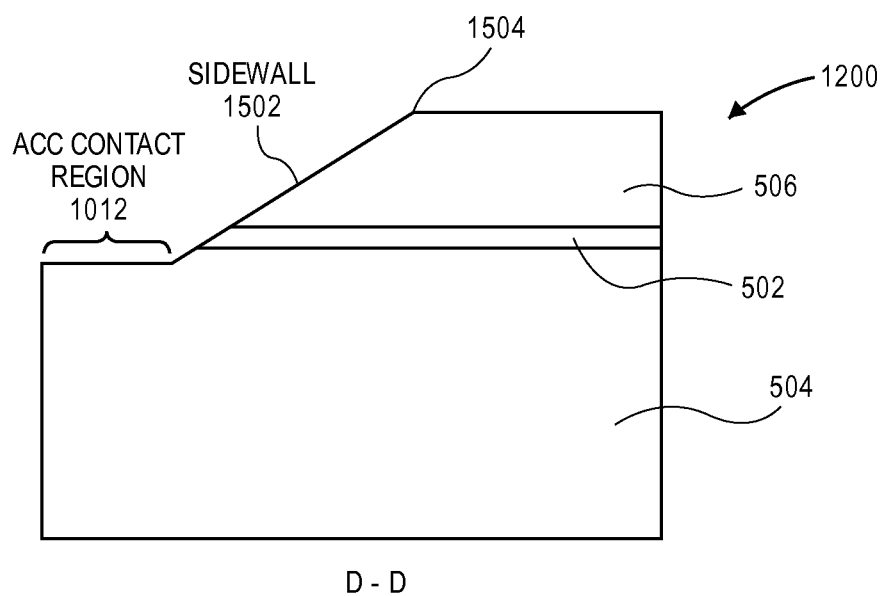

Referring to FIG. 15, a cross-sectional view, taken about line D-D of FIG. 14, of a precursor cell having an ablated anode current collector contact region is shown in accordance with an embodiment. As described above, the precursor cell 1200 may be ablated to remove portions of the cathode layer 506 and the barrier film layer 502. Some portion of the cathode current collector 504 may also be ablated. Thus, an anode current collector contact region 1012 on an upper surface of the cathode current collector 504, as well as a sidewall 1502 along an ablated surface of the cathode layer 506 and the barrier film layer 502, may be formed. The sidewall 1502 may include a non-vertical slope extending between a cathode top edge 1504 and the anode current collector contact region 1012. The sidewall 1502 slope may have a planar surface or a curved surface and be contiguous across the various ablated layers, as described above. Note that at least a portion of cathode current collector 504 may be a sloped sidewall between anode current collector contact region 1012 and barrier film layer 502. Thus, the anode current collector contact region 1012 may be formed by only partially ablating through precursor cell 1200, i.e., the laser ablation process may remove material from a top surface of precursor cell 1200 to the anode current collector contact region 1012 on cathode current collector 504 without cutting through the entire thickness of precursor cell 1200 as may be the case in a traditional laser cutting process.

Figure 16:
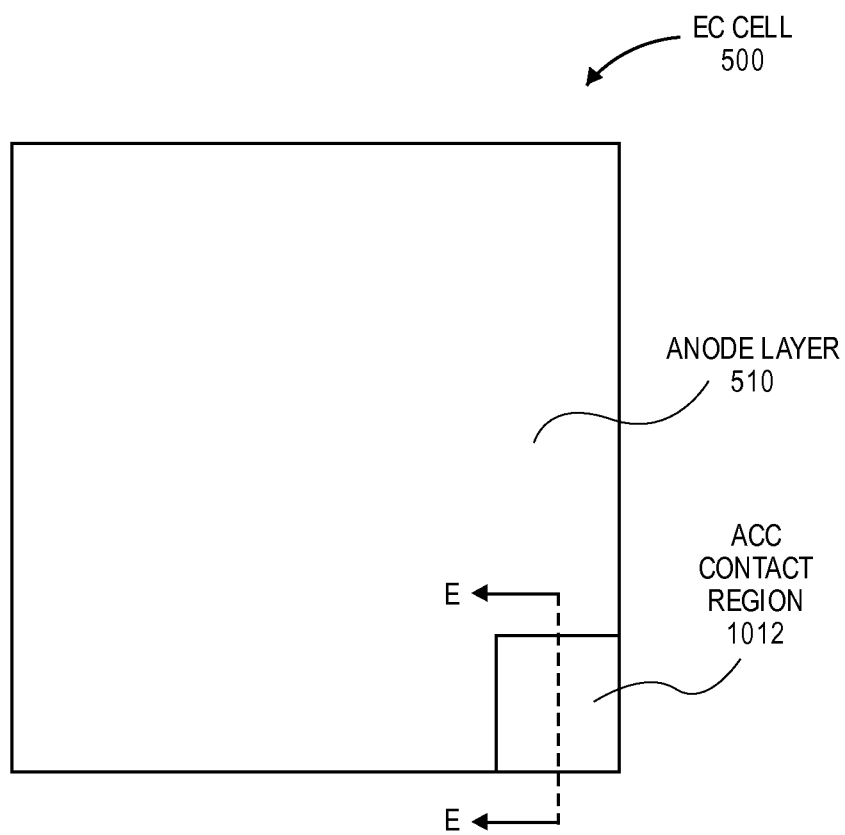
Figure 17:
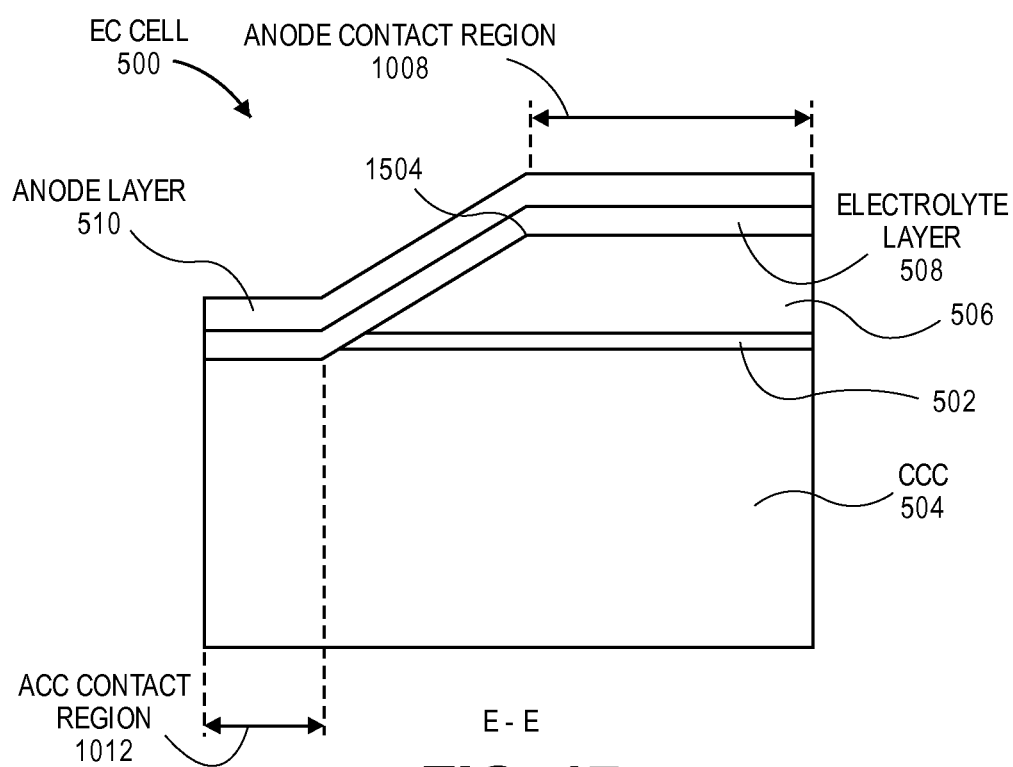

Referring to FIG. 16, a top view of an electrochemical cell having the anode current collector contact region offset in a vertical direction is shown in accordance with an embodiment. FIG. 17 is a cross-sectional view, taken about line E-E of FIG. 16, showing how an anode current collector contact region 1012 may be recessed in a vertical direction (vertical direction as seen in the figure). The electrolyte layer 508 and the anode layer 510 are deposited over the cathode layer 506 of the precursor cell 1200. Deposition of the layers may be achieved using known processes, such as physical vapor deposition or other suitable technique. In this case, each of the electrolyte layer 508 and the anode layer 510 are formed with uniform thickness across the entire upper surface area of the precursor cell 1200, including over the previously ablated anode current collector contact region 1012 and the sloped portion of cathode current collector 504 between anode current collector contact region 1012 and barrier film layer 502. Deposition, coating, etc., of the electrolyte layer 508 and the anode layer 510 may uniformly cover the underlying anode current collector contact region 1012, i.e., the exposed cathode current collector 504, to form an upper surface of electrochemical cell 500, having an anode layer 510 with the anode contact region 1008 as indicated, and the anode current collector contact region 1012. In one embodiment, the anode layer 510 is the same thickness over its surface area and follows the tapered region between the cathode top edge 1504 and the anode current collector contact region 1012, thereby resulting in a top surface of the anode layer 510, which is located directly over the anode current collector contact region 1012, to be vertically recessed in a vertical direction below a top surface of the anode layer 510 that is located directly over the anode contact region 1008.

Figure 18:
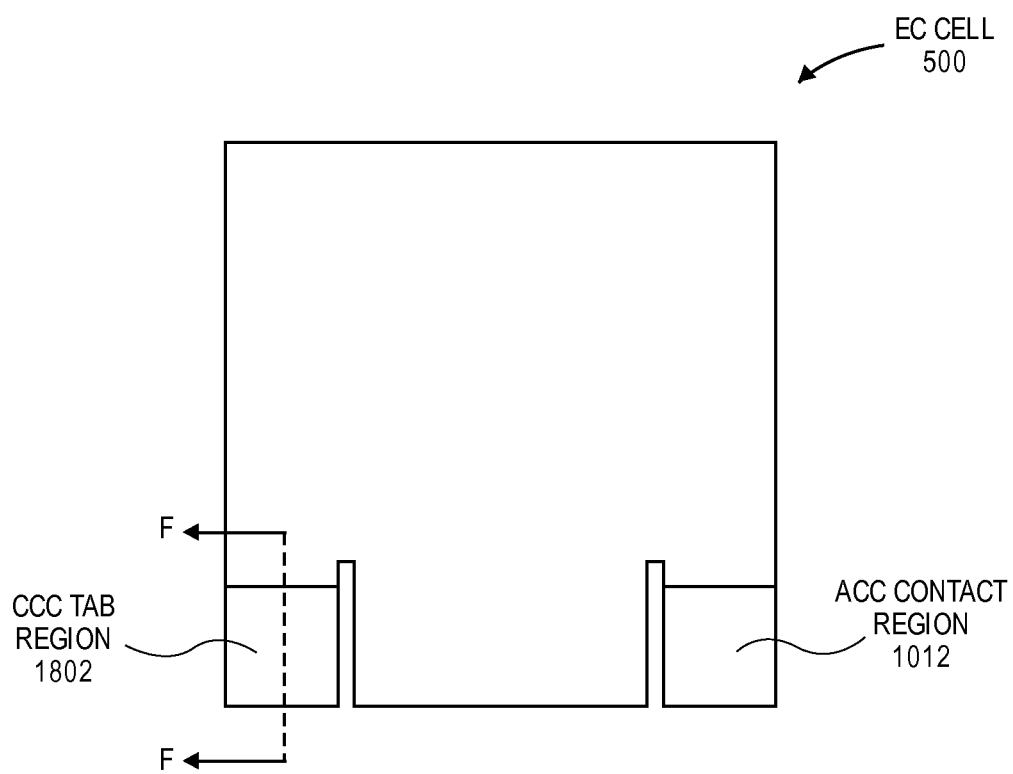
Figure 19:
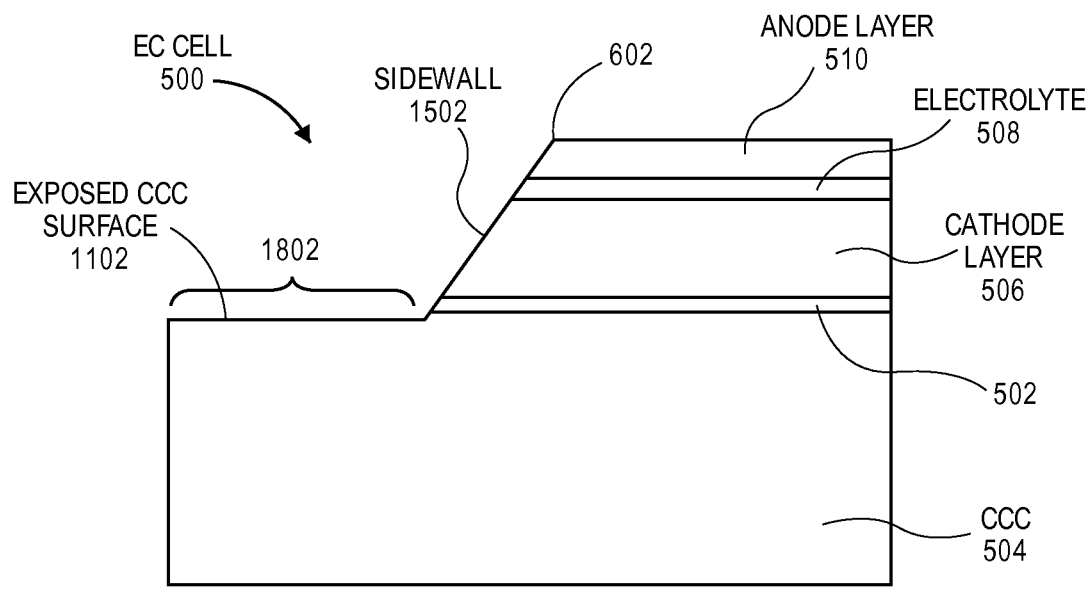

Referring to FIG. 18, a top view of the electrochemical cell having a cathode current collector tab region that is offset in a vertical direction (from an anode layer) is shown, wherein a corner of the electrochemical cell 500 that is opposite from the anode current collector contact region 1012 is ablated to expose the cathode current collector 504 and form a cathode current collector tab region 1802. See the cross-sectional view, taken about line F-F of FIG. 18, in FIG. 19. Similar to the creation of the vertically recessed anode current collector contact region 1012 (see FIGS. 16-17), the layers of the electrochemical cell 500 may be ablated to remove portions of the anode layer 510, the electrolyte layer 508, the cathode layer 506, and the barrier film layer 502. Furthermore, some portion of the cathode current collector 504 may be ablated to expose an upper surface of the cathode current collector 504 over a cathode current collector tab region 1802. The exposed cathode current collector surface 1102 may provide a landing for making electrical contact with the cathode current collector 504. That is, the cathode current collector surface 1102 may be exposed in the sense that it is not covered by any other layer of the electrochemical cell 500 prior to tab insertion. However, after a tab is inserted, physical and electrical contact may be made between the cathode current collector 504 and the inserted tab, and thus, at least a portion of the cathode current collector surface 1102 may no longer be "exposed." Thus, the electrochemical cell 500 may transition from the anode layer 510 to the cathode current collector 504 by removing material to create a sidewall 1502 that slopes in a non-vertical direction between the anode layer 510 and the cathode current collector 504. Note that the sidewall 1502 is illustrated with an exaggerated taper angle, i.e., the taper run of the sidewall 1502 may actually be substantially small as compared to a top surface area of the electrochemical cell 500, and thus, sidewall 1502 is not apparent in the top view of electrochemical cell 500 illustrated in FIG. 18. More particularly, the sidewall 1502 may extend between an anode top edge 602 and the exposed cathode current collector surface 1102. The sidewall 1502 may have a non-vertical sloped surface and be contiguous across the various ablated layers, as described above. Also note that at least a portion of cathode current collector 504 may be a sloped sidewall between the upward facing exposed cathode current collector 1102 and barrier film layer 502. Thus, the cathode current collector 1102 may be formed by only partially ablating through electrochemical cell 500, i.e., the laser ablation process may remove material from a top surface of electrochemical cell 500 to the exposed cathode current collector 1102 on cathode current collector 504 without cutting through the entire thickness of electrochemical cell 500 as may be the case in a traditional laser cutting process.

Figure 20:
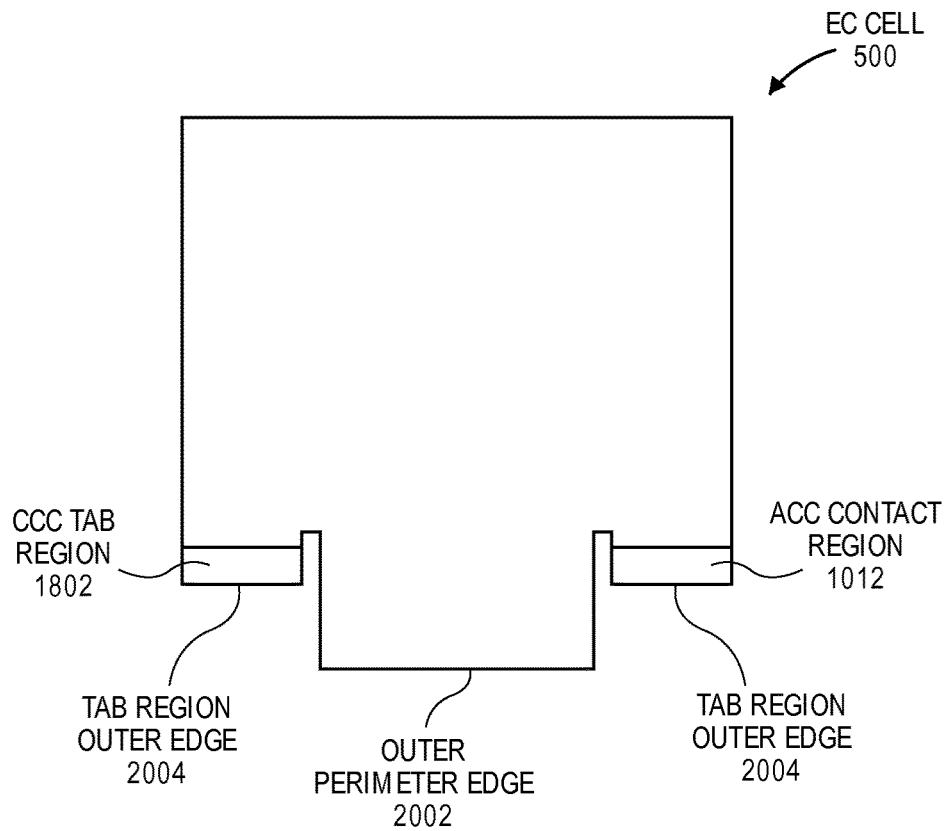
Figure 21:
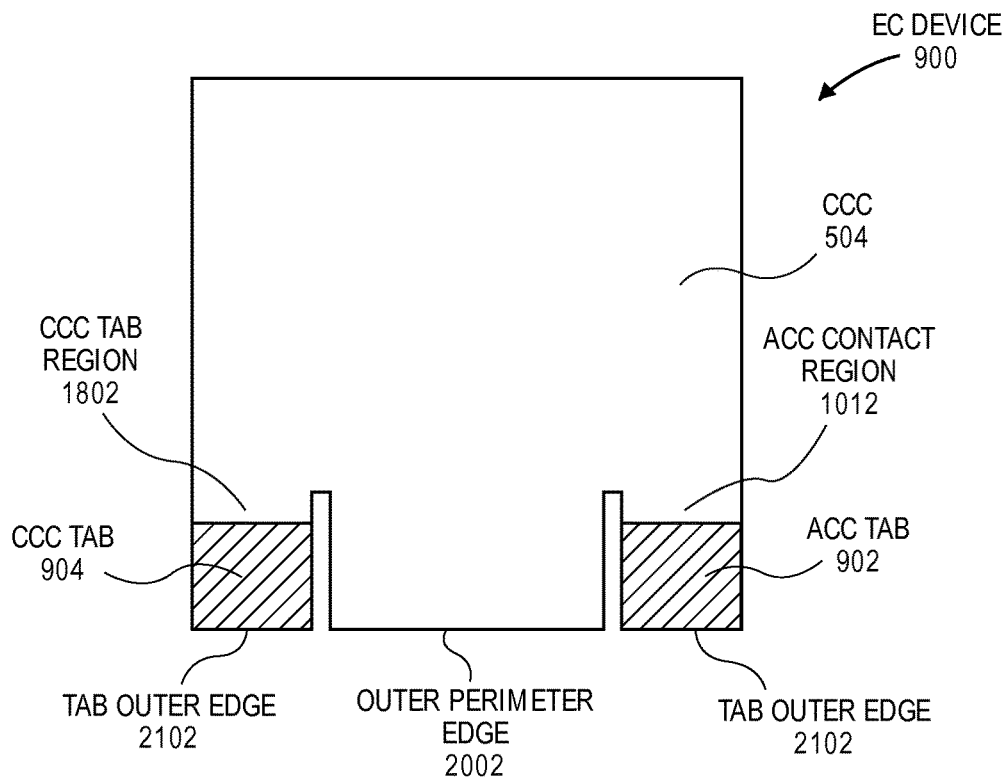

Referring to FIG. 20, a top view of an electrochemical cell having a cathode current collector tab region 1802 that is offset in a vertical direction is shown. In an embodiment, the anode current collector contact region 1012 and the cathode current collector tab region 1802 are trimmed back from the perimeter of the electrochemical cell 500, creating an offset in a transverse direction, between an outer perimeter edge 2002 and a tab region outer edge 2004. As described above, such a gap may be filled by a respective anode current collector tab 902 or cathode current collector tab 904 during assembly of an electrochemical device to define an outer boundary for electrochemical cell 500 or electrochemical device 900 that is a simple shape, e.g., a regular convex polygon shape such as a square. This can be seen in the top view of the device shown in FIG. 21. More particularly, the tabs can be described as being integrated with the cell structure and sandwiched between electrochemical cells, and extend away from the contact regions 1012, 1802 to fill the gaps to result in a profile in which outer edge 2002 of the cell perimeter and the tab edges 2102 are aligned, e.g., as when the electrochemical cell 500 has a square or rectangular profile as seen in FIG. 21.

Figure 22:
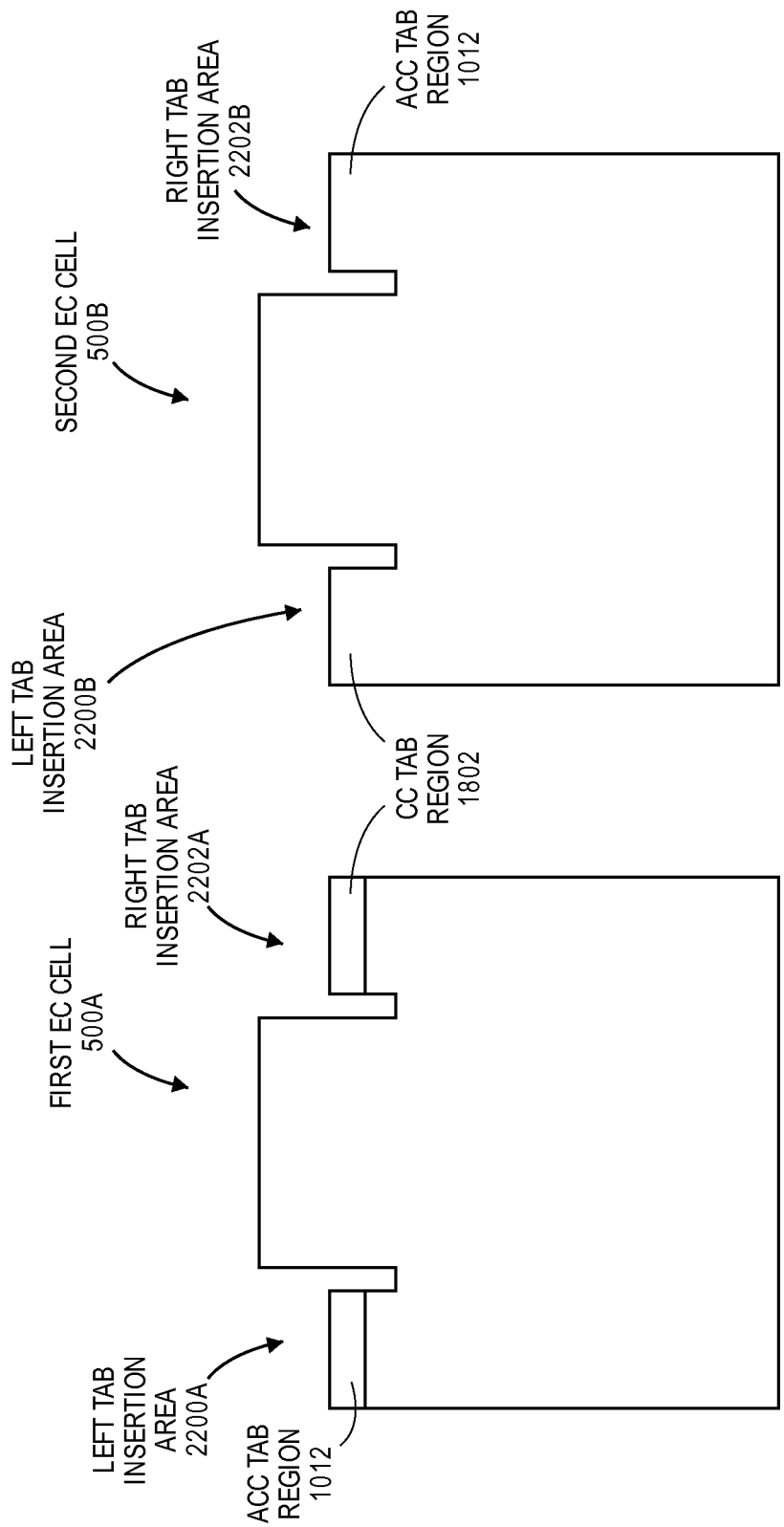
FIG. 22 is a top view of two electrochemical cells prior to being stacked to form an electrochemical device in accordance with an embodiment.

Referring to FIG. 22, a top view of two electrochemical cells prior to being stacked to form an electrochemical device is shown in accordance with an embodiment. In an embodiment, at least two electrochemical cells 500A and 500B include respective first and second tab insertion areas. For example, a first electrochemical cell 500A may include a left tab insertion area 2200A and a right tab insertion area 2202A. Similarly, a second electrochemical cell 500B may include a left tab insertion area 2200B and a right tab insertion area 2202B. The first electrochemical cell 500A may be flipped to stack on second electrochemical cell 500B, for example, to form an electrochemical device 900 having facing anode layers. Thus, in an assembled configuration, the left tab insertion area 2200A may face the right tab insertion area 2202B, and the right tab insertion area 2202A may face the left tab insertion area 2200B. Accordingly, tab insertion areas of first electrochemical cell 500A and second electrochemical cell 500B may be mirror images of each other with respect to which type of tab is inserted into left and right tab insertion areas. That is, tab insertion areas 2200A and 2202B may be configured to contact anode current collector tab 902 and tab insertion areas 2202A and 2200B may be configured to contact cathode current collector tab 904. In an embodiment, both tab insertion areas of mating tab insertion areas may include recessed contact regions, such as anode current collector contact region 1012 or cathode current collector tab region 1802 offset in a vertical direction from 1008 as described above. In other embodiments, mating tab insertion areas may include only one recessed area. For example, first electrochemical cell 500A may include recessed left tab insertion area 2200A, e.g., a recessed anode current collector contact region 1012, and right tab insertion area 2200B, e.g., a recessed cathode current collector tab region 1802, and the mating left and right tab insertion areas 2200A, 2202B may not be recessed over the respective current collector contact regions. As a result, the current collector tabs may fill a vertical space between the electrochemical cells 500 that is half the separation distance of insertion void 1006 in FIGS. 10-11. Nonetheless, z-height may be reduced and the tabs may be recessed into the device in a transverse direction to provide for a device profile in which the outer perimeter edge 2002 is aligned with tab outer edges 2102. More particularly, the electrochemical device of FIGS. 9-11 may be formed.

The present invention also provides the following itemized embodiments:

1. An article of manufacture comprising: several electrochemical cells singulated from a sheet, wherein adjacent ones of the several electrochemical cells are separated by a gap that is tapered.

2. An article of manufacture, comprising: a first electrochemical cell with a second electrochemical cell, each cell having a respective electrolyte layer between a respective anode layer and a respective cathode layer in a stack direction, wherein the cells are separated by a separation distance in the stack direction that varies in a transverse direction, and wherein the separation distance is greater over an outer region of the coupled cells than over an inner region of the coupled cells.

3. The article of manufacture of item 2, wherein the outer region includes an anode collector contact region and the inner region includes an anode contact region, and wherein the anode collector contact region is electrically connected to the anode contact region.

4. The article of manufacture of item 3, wherein the respective anode layers extend over one or more of the anode contact region or the anode collector contact region.

5. A method, comprising: setting an intensity of a laser beam to a level less than required to melt one or more layers of an electrochemical cell; and lasing the one or more layers of the electrochemical cell with the laser beam to form a cell sidewall having a non-zero, non-vertical slope.

6. The method of item 5, wherein the one or more layers include an electrolyte layer stacked between an anode layer and a cathode layer in a vertical direction, the one or more layers having respective sidewalls making up at least a portion of the cell sidewall.

7. The method of item 6, wherein the anode layer includes an anode top surface, and wherein a height of the cell sidewall diminishes in a transverse direction outwardly.

8. The method of item 7, wherein the respective sidewalls of the anode layer, the electrolyte layer, and the cathode layer are contiguous along the non-vertical slope.

9. The method of item 8, wherein the non-vertical slope includes a linear slope portion.

10. The method of item 8, wherein the non-vertical slope includes a curvilinear slope portion.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An electrochemical device, comprising:
a first electrochemical cell, comprising:
a first electrolyte layer between a first anode layer and a first cathode layer in a vertical direction, wherein the first anode layer, the first electrolyte layer, and the first cathode layer include respective sidewalls exposed along a first cell sidewall, and wherein the first cell sidewall has a non-zero, non-vertical slope; and
a second electrochemical cell, comprising:
a second electrolyte layer between a second anode layer and a second cathode layer in a vertical direction, wherein the second anode layer, the second electrolyte layer, and the second cathode layer include respective sidewalls exposed along a second cell sidewall, the second cell sidewall has a non-zero, non-vertical slope, and the second anode layer contacts a top surface of the anode layer of the first electrochemical cell; and
a cathode current collector tab in contact with the first cell side wall of the first electrochemical cell and the second cell sidewall of the second electrochemical cell.

2. The electrochemical device of claim 1, wherein the first anode layer includes a top surface, and wherein a height of the first cell sidewall diminishes in a transverse direction outwardly from the top surface along the non-zero, non-vertical slope.

3. The electrochemical device of claim 2, wherein the respective exposed sidewalls of the first anode layer, the first electrolyte layer, and the first cathode layer are contiguous along the non-zero, non-vertical slope.

4. The electrochemical device of claim 3, wherein the non-zero, non-vertical slope includes a linear slope portion.

5. The electrochemical device of claim 3, wherein the non-zero, non-vertical slope includes a curvilinear slope portion.

6. The electrochemical device of claim 3, wherein the exposed sidewall of the first anode layer extends between an anode top edge on the top surface and the exposed sidewall of the first electrolyte layer, and wherein the exposed sidewall of the first electrolyte layer extends between the exposed sidewall of the first anode layer and the exposed sidewall of the first cathode layer.

7. The electrochemical device of claim 6, wherein the exposed sidewall of the first cathode layer is offset from the exposed sidewall of the first anode layer in the vertical direction and in a transverse direction outwardly along the non-zero, non-vertical slope.

8. The electrochemical device of claim 2, wherein the first electrochemical cell further comprises:
a first cathode current collector having a top surface, wherein the first cathode layer is over the top surface of the first cathode current collector, wherein the height of the first cell sidewall diminishes in the transverse direction outwardly from the top surface of the first anode layer along the non-zero, non-vertical slope to a terminal edge on the first cathode current collector, and wherein the terminal edge is offset in the vertical direction from the top surface of the first cathode current collector.

9. The electrochemical device of claim 8, wherein the first cathode current collector includes a bottom surface below the top surface of the first cathode current collector, and wherein the terminal edge is on the bottom surface and the first cell sidewall diminishes from the top surface of the first anode layer to the terminal edge across a cell height of the first electrochemical cell.

10. The electrochemical device of claim 1, wherein the first cathode layer of the first electrochemical cell includes a first cathode current collector having a first exposed horizontal surface and the second cathode layer has a second cathode current collector having a second exposed horizontal surface, the cathode current collector tab also in contact with the first exposed horizontal surface and the second exposed horizontal surface.

11. An electrochemical device, comprising:
a first electrochemical cell, comprising:
a first anode layer, a first electrolyte layer, a first cathode layer, and a first cathode current collector stacked in a vertical direction, wherein the first anode layer, the first electrolyte layer, and the first cathode layer include respective sidewalls exposed by removing material from the layers using an ablation process, and wherein the respective sidewalls of the first anode layer, the first electrolyte layer, and the first cathode layer are exposed and contiguous with each other along a first cell sidewall,
wherein the first cathode current collector has an exposed horizontal surface that is in a first vertical plane and a cathode contacting surface that is in a second vertical plane that is different from the first vertical plane.

12. The electrochemical device of claim 11, wherein the first cell sidewall has a non-zero, non-vertical slope.

13. The electrochemical device of claim 12, wherein the first cathode layer is over a top surface of the first cathode current collector, wherein the first cathode current collector includes a sidewall exposed by removing material from the first cathode current collector using the ablation process, wherein the sidewall of the first cathode current collector is exposed and contiguous with the other exposed sidewalls of the first anode layer, the first electrolyte layer, and the first cathode layer, and wherein a height of the first cell sidewall diminishes outwardly from a top surface of the first anode layer along the non-zero, non-vertical slope.

14. The electrochemical device of claim 12, wherein an exposed sidewall of the first anode layer extends between an anode top edge on a top surface and an exposed sidewall of the first electrolyte layer, and wherein the exposed sidewall of the first electrolyte layer extends between an exposed sidewall of the first anode layer and an exposed sidewall of the first cathode layer.

15. The electrochemical device of claim 14, wherein the exposed sidewall of the first cathode layer is offset from the exposed sidewall of the anode layer in the vertical direction and in a transverse direction outwardly along the non-zero, non-vertical slope.

16. The electrochemical device of claim 11, further comprising a second electrochemical cell comprising:
a second anode layer, a second electrolyte layer, a second cathode layer, and a second cathode current collector stacked in the vertical direction, wherein the second anode layer, the second electrolyte layer, and the second cathode layer include respective sidewalls exposed by removing material from the second anode layer, the second electrolyte layer, and the second cathode layer using the ablation process, and wherein a top surface of the second anode layer is in contact with a top surface of the first anode layer; and
a cathode current collector tab in contact with each of the first cathode current collector and the second cathode current collector.

17. The electrochemical device of claim 16, wherein the first cathode current collector has a first exposed horizontal surface and the second cathode current collector has a second exposed horizontal surface, the cathode current collector tab in contact with the first exposed horizontal surface and the second exposed horizontal surface.

18. The electrochemical device of claim 17, wherein the first exposed horizontal surface of the first cathode current collector is in a first vertical plane and a first cathode contacting surface is in a second vertical plane that is different from the first vertical plane, and the second exposed horizontal surface of the second cathode current collector is in a third vertical plane and a second cathode contacting surface of the second cathode current collector is in a fourth vertical plane that is different from the third vertical plane.

* * * * *